US006954729B2

United States Patent
Lee et al.

(10) Patent No.: US 6,954,729 B2
(45) Date of Patent: Oct. 11, 2005

(54) ADDRESS LEARNING SYSTEM AND METHOD FOR USING SAME

(75) Inventors: Raymond Lee, Chicago, IL (US); Lee Bourek, Richardson, TX (US); Tony Chan, Northbrook, IL (US); Amit Shah, Mount Prospect, IL (US)

(73) Assignee: Bowe Bell & Howell Postal Systems Company, Wheeling, IL (US)

( * ) Notice: Subject to any disclaimer, the term of this patent is extended or adjusted under 35 U.S.C. 154(b) by 551 days.

(21) Appl. No.: 09/770,984

(22) Filed: Jan. 26, 2001

(65) Prior Publication Data

US 2001/0054031 A1 Dec. 20, 2001

Related U.S. Application Data

(60) Provisional application No. 60/178,450, filed on Jan. 27, 2000.

(51) Int. Cl.$^7$ ............................................... G06F 17/60
(52) U.S. Cl. .......................................... 705/1; 705/401
(58) Field of Search ...................... 705/1, 401; 382/101

(56) References Cited

U.S. PATENT DOCUMENTS 5,050,218 A * 9/1991 Ikeda et al. .................. 382/101
5,422,821 A * 6/1995 Allen et al. .................. 700/219

(Continued)

FOREIGN PATENT DOCUMENTS

EP          301909 A2 * 2/1989    ............. B07C/3/00
JP     09057204 A * 3/1997    ............. B07C/3/14

OTHER PUBLICATIONS

Drummond, William J., "Address matching—GIS technology for mapping human activity patterns," Journal of the American Planning Association, v61n2, pp:240–251, Spring 1995.*

Primary Examiner—John G. Weiss
Assistant Examiner—Jonathan Ouellette
(74) Attorney, Agent, or Firm—McDermott Will & Emery LLP

(57) ABSTRACT

A computerized method for learning a delivery point of a first mail piece by using unmatched and/or unused data from at least one other mail piece is disclosed. The method comprises the steps of: (a) capturing a text string from said other mail piece using capture means; (b) comparing said text string to a first set of preexisting data in an address database to determine a match for said other mail piece according to a first set of predetermined rules; (c) separating the matched and used data from the unmatched and unused data for said other mail piece determined by step (b); and (d)correlating said unmatched and/or unused data from said other mail piece to a second set of preexisting data relating to said first mail piece according to a second set of predetermined rules, wherein upon the presentation of a third mail piece to the capture means with the same intended delivery point as the first mail piece and having similar unmatched and/or unused data as the at least one other mail piece, the correct point of delivery for the third mail piece can be automatically determined.

The invention further comprises a computerized system for learning a delivery point of a first mail piece by using unmatched data from at least one other mail piece, comprising: (a) means for capturing a data string of address information from said other mail piece; (b) a directory retrieval system database comprising a set of preexisting data relating to said other mail piece and further comprising means for separating matched data from the unmatched data; (c) a tag database comprising the unmatched data; (d) a tag archive; (e) means for correlating the unmatched data to the set of preexisting data according to a plurality of predetermined rules; (f) a rules database comprising said plurality of predetermined rules; and (g) a learning database to determine said delivery point of said first mail piece upon its presentation to the capture means after said other mail piece has been processed by the system.

18 Claims, 7 Drawing Sheets

U.S. PATENT DOCUMENTS

| | | | | |
|---|---|---|---|---|
| 5,452,203 A | * | 9/1995 | Moore | 707/200 |
| 5,754,671 A | * | 5/1998 | Higgins et al. | 382/101 |
| 5,781,634 A | * | 7/1998 | Cordery et al. | 705/60 |
| 5,805,710 A | * | 9/1998 | Higgins et al. | 382/101 |
| 5,910,998 A | * | 6/1999 | Yui | 382/101 |
| 6,115,707 A | * | 9/2000 | Shimomura | 707/6 |
| 6,175,827 B1 | * | 1/2001 | Cordery et al. | 705/410 |
| 6,269,171 B1 | * | 7/2001 | Gozzo et al. | 382/101 |
| 6,292,709 B1 | * | 9/2001 | Uhl et al. | 700/226 |
| 6,327,373 B1 | * | 12/2001 | Yura | 382/101 |
| 6,363,362 B1 | * | 3/2002 | Burfield et al. | 705/40 |
| 6,539,098 B1 | * | 3/2003 | Baker et al. | 382/101 |
| 6,546,005 B1 | * | 4/2003 | Berkley et al. | 370/353 |

* cited by examiner

ADDRESS LEARNING SYSTEM AND METHOD FOR USING SAME

This application claims the benefit under 35 U.S.C. 119(e) of U.S. Provisional Application No. 60/178,450 filed Jan. 27, 2000.

FIELD OF THE INVENTION

This invention relates to a computerized system for obtaining, analyzing and using postal addresses for the purpose of streamlining postal processes. In particular, the present invention relates to a computerized system for accumulating all or substantially all of the address information from a mail piece having a difficult delivery point address thereon, and associating the accumulated address information with pre-existing delivery point address information in a database to augment the delivery point address information in the database.

BACKGROUND OF THE INVENTION

A recurrent problem in the computerized processing and subsequent delivery of mail relates to the recognition of the correct address. For example, current optical character reader (OCR) systems linked to address databases do not correlate the correct mail delivery points when errors appear on the mail piece. Such errors are typically innocent and relate to the following:

1. People give a different address to the address database when supplying it to originators of mail;
2. People are born, marry, relocate, divorce, and/or die;
3. Company names are created, dissolved, changed, and/or abbreviated;
4. New buildings, thoroughfares, and sometimes towns are created, and/or names are changed;
5. People misspell words in a consistent way when transcribing addresses; and
6. Sub-classifications of buildings or companies are created, changed, and/or destroyed.

Settings where these types of problems are particularly difficult include colleges and universities, and military bases because many people reside in a small geographic location For example, a college dormitory may house thousands of residents, each of whom may denote his/her address at the dormitory differently. Because the post office's address database may only contain one "correct" delivery point address for the dormitory, it is critical that the residents and senders of mail use that "correct" address. The reality, however, is that they do not, and rather use various "close" address descriptions that imply the dormitory, but the system does not correlate such "close" data and the correct address.

Of the categories above, some of the elements of 2, 3 and 4 can be determined from publicly available data such as electoral roles and census data, but it will often be out of date. The only sure way to keep abreast of all of the events described above is to manually examine the mail stream for unknown information.

Additionally, each person may have several different aliases, which are innocent and based on simple transpositions of letters or numerals in the name or address, or are based on nicknames (e.g., William J. Clinton a/k/a Bill Clintock a/k/a Wm. Jefferson Clinton a/k/a W. C. Clinton, etc.). Alias address data is not necessarily infectious in a computer database. In other words, one person or household's habit of writing mail addresses in a non-standard format does not necessarily influence their neighbour's behaviour of using the correct postal address on their mailings.

More specifically, the OCR systems of the prior art fail to utilize the "unused" and "unmatched" data in an address. Consider, for example, the following address on a hypothetical mail piece to be read from bottom to top by a conventional OCR system:

Mr. Samuel Adams
Pleasanton Volunteer Fire Dept.
Great River Road
16 Rural Route 1
Pleasanton, Ill. 60099

Assuming that the address database linked to the OCR only needs a character string of "Pleasanton, Ill. 60099 16 Rural Route 1" to recognize that the piece is to go to Samuel Adams, the remainder of the information is unused by the system. On the other hand, if the system continues reading this address upwards in its attempt to locate the delivery point and correlates nothing in the database to "Pleasanton Volunteer Fire Dept.," then this information is unmatched, i.e., unrecognized by the system and plays no role in identifying the intended recipient of the mail piece. In either case the systems of the prior art do not capture, analyze and save such unused and unmatched data. Therefore, if other mail pieces also include such data in their addresses, such automated prior art systems will not add this information to the address database, nor will they "learn" that such unused and/or unmatched data correlate to a particular mail delivery point. They have heretofore required time-consuming and expensive human intervention.

Thus, there is a need in the art for a computerized dynamic learning system that captures the unused and/or unmatched data to automatically update the address database with information which would be helpful in establishing a correct delivery point for a mail piece. There is a further need for a computerized dynamic learning system that associates unused and/or unmatched data with address information previously existing in a postal database to establish correct delivery point address information in the database.

SUMMARY OF THE INVENTION

In a broad sense, the system of the present invention provides the mechanism for capturing the unused and/or unmatched address data on a mailpiece, analyzing the data, and correlating such data to mail delivery points within the master address database to "teach" the system how to better identify the addresses presented as input during scanning. When a sufficient percentage of addresses scanned by the OCR utilises the same alias record for mail delivery for a postal delivery point, i.e. a house or an organisation, the alias record will be linked to this delivery point. This process is called "address learning." When a sufficient percentage of addresses scanned by the OCR utilises the same alias record for mail delivery within the same area or on the same street, etc., the alias record will be promoted to be associated with the mail delivery region that covers the geographic area. This process is called "area promotion." An alias can be promoted to cover several postal delivery regions, i.e. zip codes, when it covers a larger geographic area. When describing areas for an alias, it is important to do so in a way that the address recognition systems of the present invention can interpret them and correctly associate them with mail delivery points, otherwise the information cannot be used effectively. The means to extract this unmatched or unused address data can be accomplished by one or more of the following means, i.e. portable or hand-held image capture device, human operating video display terminal with keyboard, or computer algorithms for automatic data type classification and character fuzziness removal.

These and other advantages and objects of the invention are achieved by providing a computerized method for learning a delivery point address and updating a database of such delivery point addresses by using unmatched and/or unused data from at least one mail piece, comprising:

(a) capturing an address text string from said mail piece using image capture means;

(b) comparing said text string to a first set of preexisting data in said address database to determine a match for said data on said mail piece according to a first set of predetermined rules;

(c) separating the matched and/or used data from the unmatched and/or unused data for said mail piece determined by step (b); and (d) correlating said unmatched and/or unused data from said mail piece to a second set of preexisting data according to a second set of predetermined rules, wherein upon the presentation of another mail piece to the image capture means with the same intended delivery point as the first mail piece and having similar unmatched and/or unused data as the first piece, the correct point of delivery for the other mail piece can be automatically determined.

The invention further comprises a computerized system for learning a delivery point address and updating a database of such delivery point addresses by using unmatched data from at least one mail piece, comprising: (a) means for capturing a data string of address information from said mail piece; (b) a directory retrieval system database comprising a set of preexisting data relating to an address to which said mailpiece is directed, and further comprising means for separating matched data on the mailpiece from the unmatched data; (c) a database comprising the unmatched or unused data; (d) means for correlating the unmatched and/or unused data to the set of preexisting data according to a plurality of predetermined rules; (e) a rules database comprising said plurality of predetermined rules; and (f) a learning database to determine said delivery point of said mail piece upon its presentation to the capture means after the address data from said mail piece has been processed by the system.

Still other objects and advantages of the present invention will become readily apparent to those skilled in the art from the following drawings and detailed description, wherein only the preferred embodiment of the invention is shown and described simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENTS

The principles and operation of the system and method of the present invention may be better understood with reference to the drawings and accompanying description.

A. Computer System Generally.

Figure 1:
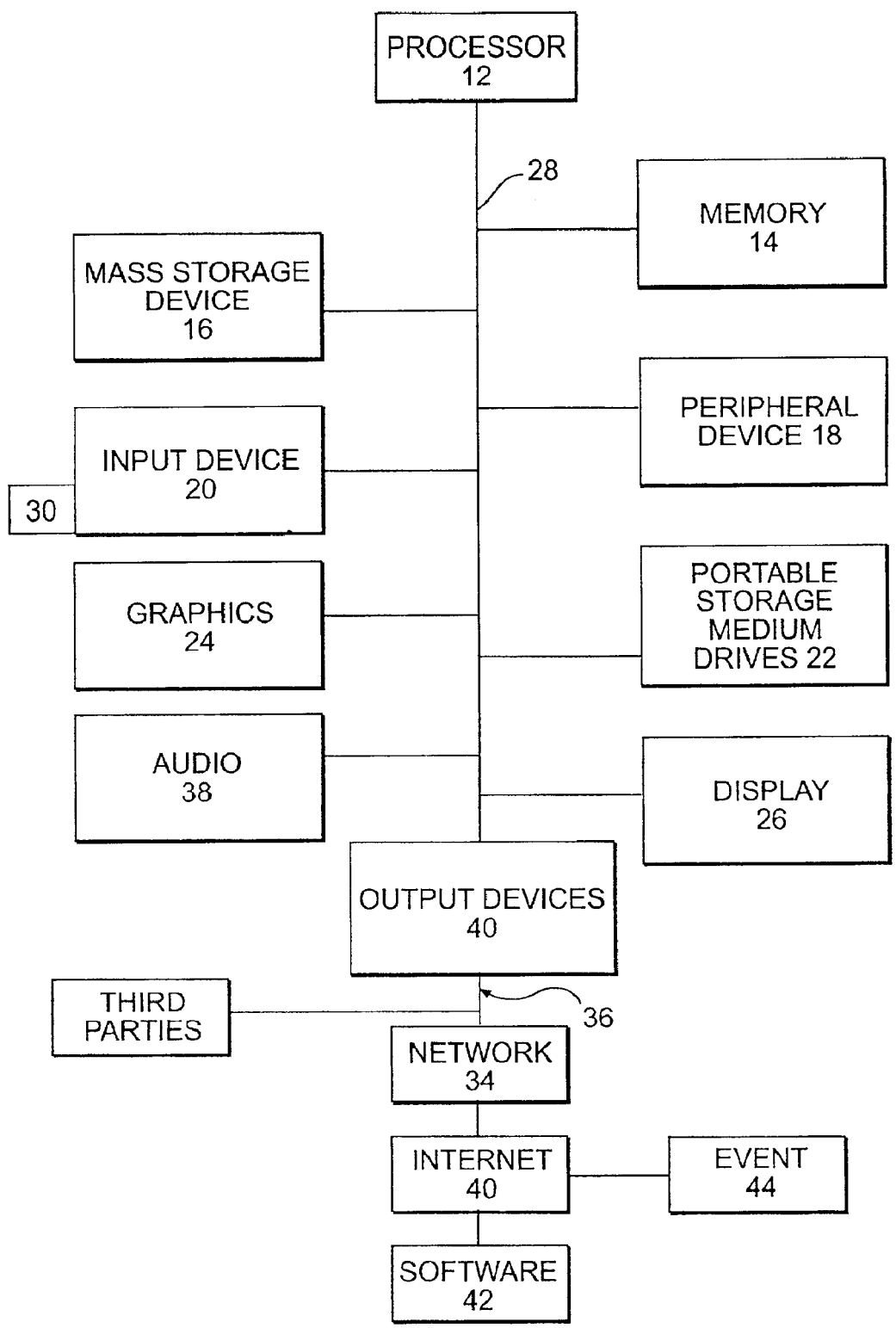
FIG. 1 is a block diagram view of an embodiment the computer system of the present invention.

FIG. 1 illustrates a high-level block diagram of a computer system which is used, in one embodiment, to implement the method of the present invention. The computer system 10 of FIG. 1 includes a processor 12 and memory 14. Processor 12 may contain a single microprocessor, or may contain a plurality of microprocessors for configuring the computer system as a multi-processor system. Memory 14, stores, in part, instructions and data for execution by processor 12. If the system of the present invention is wholly or partially implemented in software, including a computer program, memory 14 stores the executable code when in operation. Memory 14 may include banks of dynamic random access memory (DRAM) as well as high speed cache memory.

The system of FIG. 1 further includes a mass storage device 16, peripheral device(s) 18, input device(s) 20, portable storage medium drive(s) 22, a graphics subsystem 24 and a display 26. For purposes of simplicity, the components shown in FIG. 1 are depicted as being connected via a single bus 28. However, the components may be connected through one or more data transport means. For example, processor 12 and memory 14 may be connected via a local microprocessor bus, and the mass storage device 16, peripheral device(s) 18, portable storage medium drive(s) 22, and graphics subsystem 24 may be connected via one or more input/output (I/O) buses. Mass storage device 16, which is typically implemented with a magnetic disk drive or an optical disk drive, is a non-volatile storage device for storing data and instructions for use by processor 12. In another embodiment, mass storage device 16 stores the computer program implementing the method of the present invention. The method of the present invention also may be stored in processor 12.

Portable storage medium drive 22 operates in conjunction with a portable non-volatile storage medium, such as a floppy disk, or other computer-readable medium, to input and output data and code to and from the computer system of FIG. 1. In one embodiment, the method of the present invention is stored on such a portable medium, and is input to the computer system 10 via the portable storage medium drive 22. Peripheral device(s) 18 may include any type of computer support device, such as an input/output (I/O) interface, to add additional functionality to the computer system 10. For example, peripheral device(s) 18 may include a network interface card for interfacing computer system 10 to a network, a modem, and the like.

Input device(s) 20 provide a portion of a user interface (UI). Input device(s) 20 may include an alpha numeric keypad 30 for inputting alpha numeric and other key information, or a pointing device, such as a mouse, a trackball, stylus or cursor direction keys, or an image capture 9CCD) camera, or an OCR. All such devices provide additional means for interfacing with and executing the method of the present invention. In order to display textual and graphical information, the computer system 10 of FIG.

1 includes graphics subsystem 24 and display 26. Display 26 may include a cathode ray tube (CRT) display, liquid crystal display (LCD), other suitable display devices, or means for displaying, that enables a user to view the execution of the inventive method. Graphics subsystem 24 receives textual and graphical information and processes the information for output to display 26. Display 26 can be used to display component interfaces and/or display other information that is part of a user interface. The display 26 provides a practical application of the method of the present invention since the method of the present invention may be directly and practically implemented through the use of the display 36. The system 10 of FIG. 1 also includes an audio system 38. In one embodiment, audio system 38 includes a sound card that receives audio signals from a microphone that may be found in peripherals 18. Additionally, the system of FIG. 1 includes output devices 40. Examples of suitable output devices include speakers, printers, and the like.

The devices contained in the computer system of FIG. 1 are those typically found in general purpose computer systems, and are intended to represent a broad category of such computer components that are well known in the art. The system of FIG. 1 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and the like.

Alternative embodiments of the use of the method of the present invention in conjunction with the computer system 10 further include using other display means for the monitor, such as CRT display, LCD display, projection displays, or the like. Likewise, any similar type of memory, other than memory 14, may be used. Other interface means, in addition to the component interfaces, may also be used including alpha numeric keypads, other key information or any pointing devices such as a mouse, trackball, stylus, cursor or direction key.

In a further embodiment, the present invention also includes a computer program product which is a storage medium (media) having instructions stored thereon/in which can be used to program a computer to perform the method of interfacing of the present invention. The storage medium can include, but is not limited to, any type of disk including floppy disks, optical disks, DVD, CD ROMs, magnetic optical disks, RAMs, EPROM, EEPROM, magnetic or optical cards, or any type of media suitable for storing electronic instructions.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the method of interfacing of the present invention as described above.

B. Address Learning System (ALS) Components.

Figure 2:
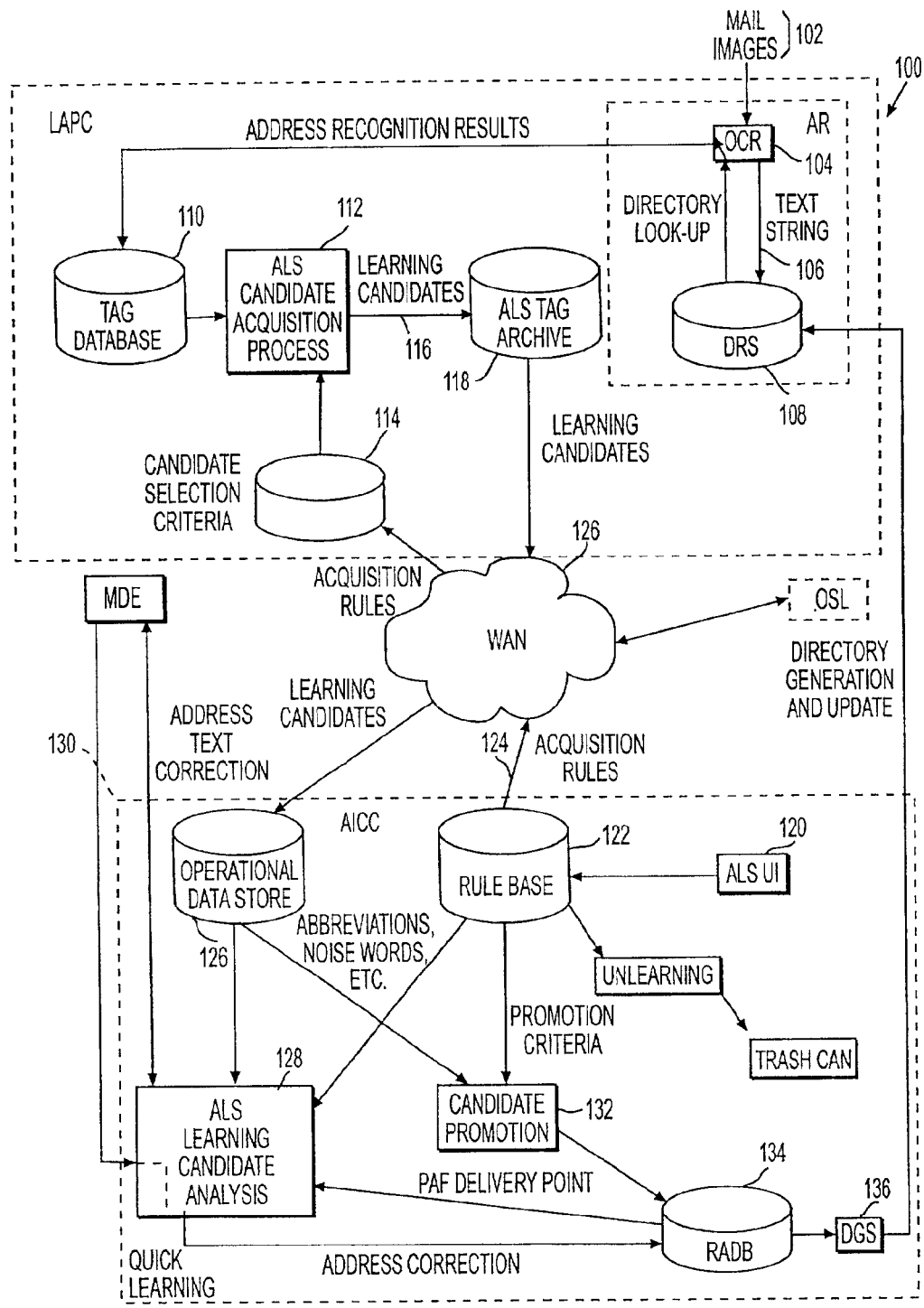
FIG. 2 is a block diagram view of an embodiment of the address learning system of the present invention.

Broadly speaking, as illustrated in FIGS. 1 and 2, computer system 10 is integrated with and in communication with address learning system (ALS) 100 of FIG. 2. The mail images 102 are scanned through optical character recognition device (OCR) 104 as is known in the art. Text string 106 is captured as a digital signal and is transmitted to directory retrieval database 108, which is searched for matches to text string 106. If a match is found having an acceptable degree of certainty, the mail piece being processed is sent to the delivery point as is known in the art. Any unused or unmatched data from text string 106, irrespective of whether any matching data was found in database 108, are then transmitted as signals to tag database 110. Next, in step 112, the data in tag database 110 are searched according to a first set of predetermined rules 114 to group the learning candidates 116 into tag archive 118.

Upon an initiation signal from ALS UI 120, rules base 122 transmits the acquisition rules 124 through wide area network (WAN) 126 to tag archive 118. The learning candidates 116 are then communicated to operational data storage device 126, which in turn is searched by ALS search engine 128. Search engine 128 is part of central processor 130 and can be SSA-Name 3 V1.8 (Search Software America), Name Search V.30 (Intelligent Search Technology Ltd.), or other like system. Such software is programmed to search learning candidates according to applicant's algorithms employing rules 114.

Using rules 114, search engine 128, in conjunction with rules base 122, correlates the unmatched and unused data captured as text string 106 in logical groupings related to the delivery point for each corresponding mail piece and, if applicable, promotes the unmatched and unused candidate data in step 132, as explained in more detail below. More specifically, if the candidate data satisfies the promotion criteria in rules base 122, the data is promoted and transferred to mail directory database 134. This promoted data is then communicated via directory generation system 136 to directory retrieval system 108. Thus, ALS 100 "learns" from the unused and unmatched data it captures such that it can be used for future mail pieces to identify their delivery points.

The information about each mail piece processed accumulates in the tag database 10. A computer process will execute a SQL query at the local OCR scanning site (local capture site) to extract learning candidates. This query is a result of the candidate acquisition rules defined through the address interpretation user interface (AI UI) in the address interpretation control center (AICC) system 100. Candidate selection criteria is translated into SQL queries prior to transmission to the local site. The results of the query are a value of usefulness (e.g., 0=don't store, 9=very useful) and an image archive flag (e.g., Yes or No).

One addition to the learning function is to able to prioritise the candidates with their usefulness value. For example, addresses with unmatched data are more useful than addresses with unused data.

Any changes to the acquisition rules must then demonstrate by historical simulation their effect on the volume of data acquired. This is demonstrated by running the new rules on a representative sample of the database available in the tag archive. The user is shown the result of the current rules compared with the result of the new rules when both are applied to the representative sample.

The transfer from the local site to AICC system 100 takes some time to complete. In order for the AICC system 100 to make an immediate start on learning data, the system 100 will continue processing the learning candidates transferred on the previous day. This effectively time shifts the candidate analysis by allowing for the transfer. The time between the start of data transfer and the time at which the first candidates are available for analysis at the system 100 determines the time shift.

The candidate acquisition process at each mail center in the designated geographical area is responsible for gathering potential learning candidates from the tag storage database 110 in the local site of capture. The criteria used for identifying these candidates are configured from the ALS UI in the AICC system 100. Candidate acquisition must have the capability to query the local tag storage on information associated with each mail record.

Address Reference System(s) (ARS) are utilized to process each mail piece image. Each ARS comprises, inter alia, a directory comprising an existing address database, and a look-up engine that resolves the data strings from the OCR with the existing database information. For each address resolution system (ARS) that was used to process a mail image, the following information should be recorded in the local tag storage:

ARS Product Information: This attribute should contain information concerning the different type of ARS products (i.e., machine-print OCR, hand-print OCR, manual keying, or expert keying, used for processing a mail image).

ARS Processing Time-Stamp: This attribute provides the date and time information for every ARS process performed.

ARS Processing Result: This attribute contains the processing result with its confidence level from the ARS product. If the mail is resolved to its final delivery point, the processing result should contain the delivery address key. The ARS must be able to pass unmatched data from the address block to the ALS. If unused data is detected, but not used for matching, the ARS must clearly indicate that to the ALS. In addition to results from an individual ARS, an overall processing status is also useful.

Overall Processing Status: This attribute allows the learning software to determine the final level of assignment reached by ARS.

Depending on the ARS processing results, the AICC system 100 ALS candidate analysis process may issue different work requests to further process the learning candidates. Many requirements are listed for the ALS candidate acquisition process, but most (if not all) of them need not be implemented as software running in the local capture site (LAPC). Since the candidate acquisition process will run as a database query within the local capture site, the ALS Manager UI will translate candidate selection criteria to SQL queries and transmit them to the local capture site using AI communication service. The Prime System Integrator can provide the process that executes the queries and the ALS archive. Therefore, there is an assumption that providing attribute values that should be used to select candidates and initiating transfer of the selected candidates to the ALS tag archive as the only software requirement for the ALS software running locally in each local capture site.

Figure 3:
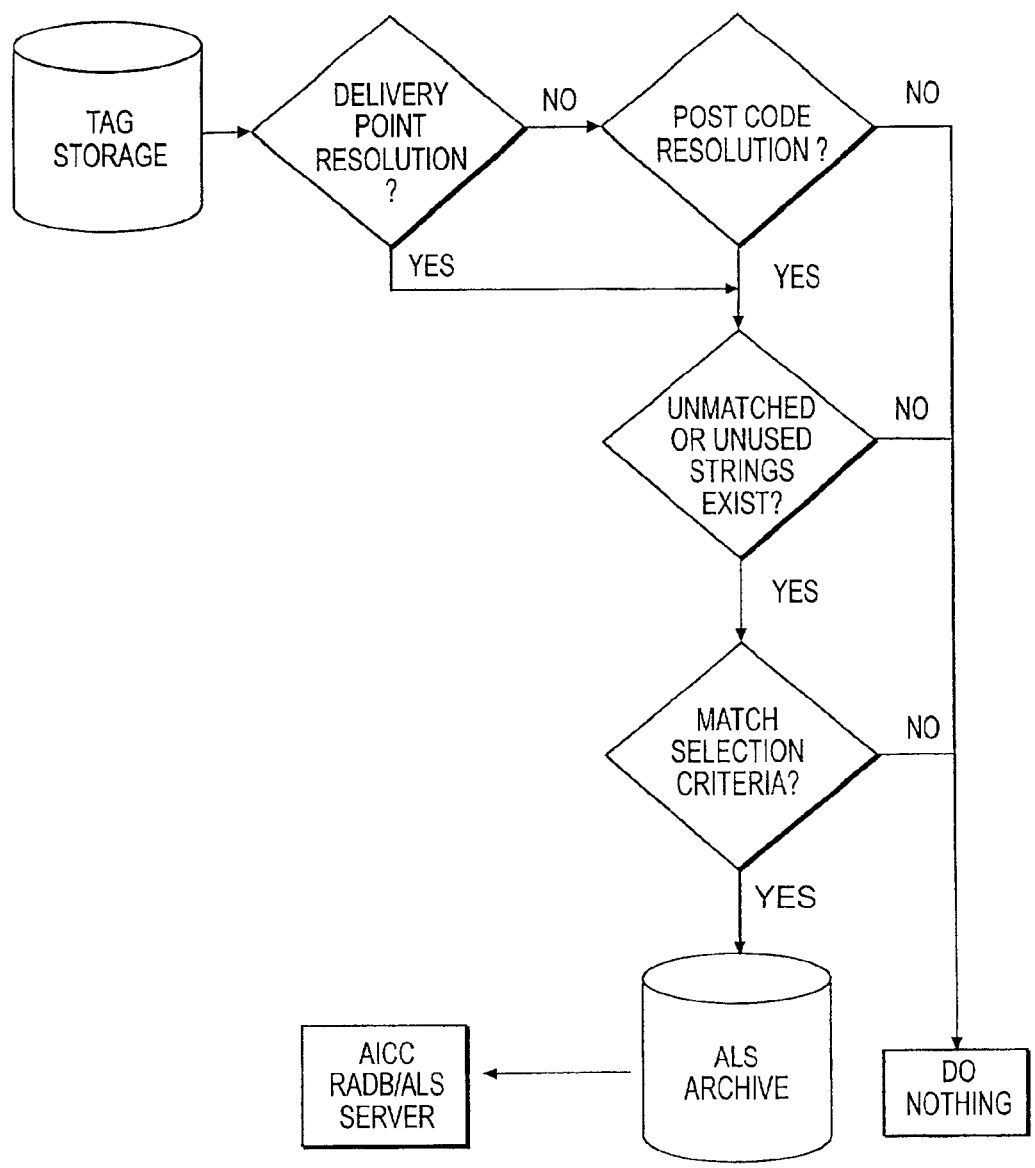
FIG. 3 is a block diagram view of the candidate acquisition process of the present invention.

The flow diagram of FIG. 3 illustrates the ALS Candidate Acquisition process. The exact nature of the flow diagram will in part depend on the content of the SQL query generated as a result of the operator-defined rules.

C. Candidate Analysis.

Figure 4:
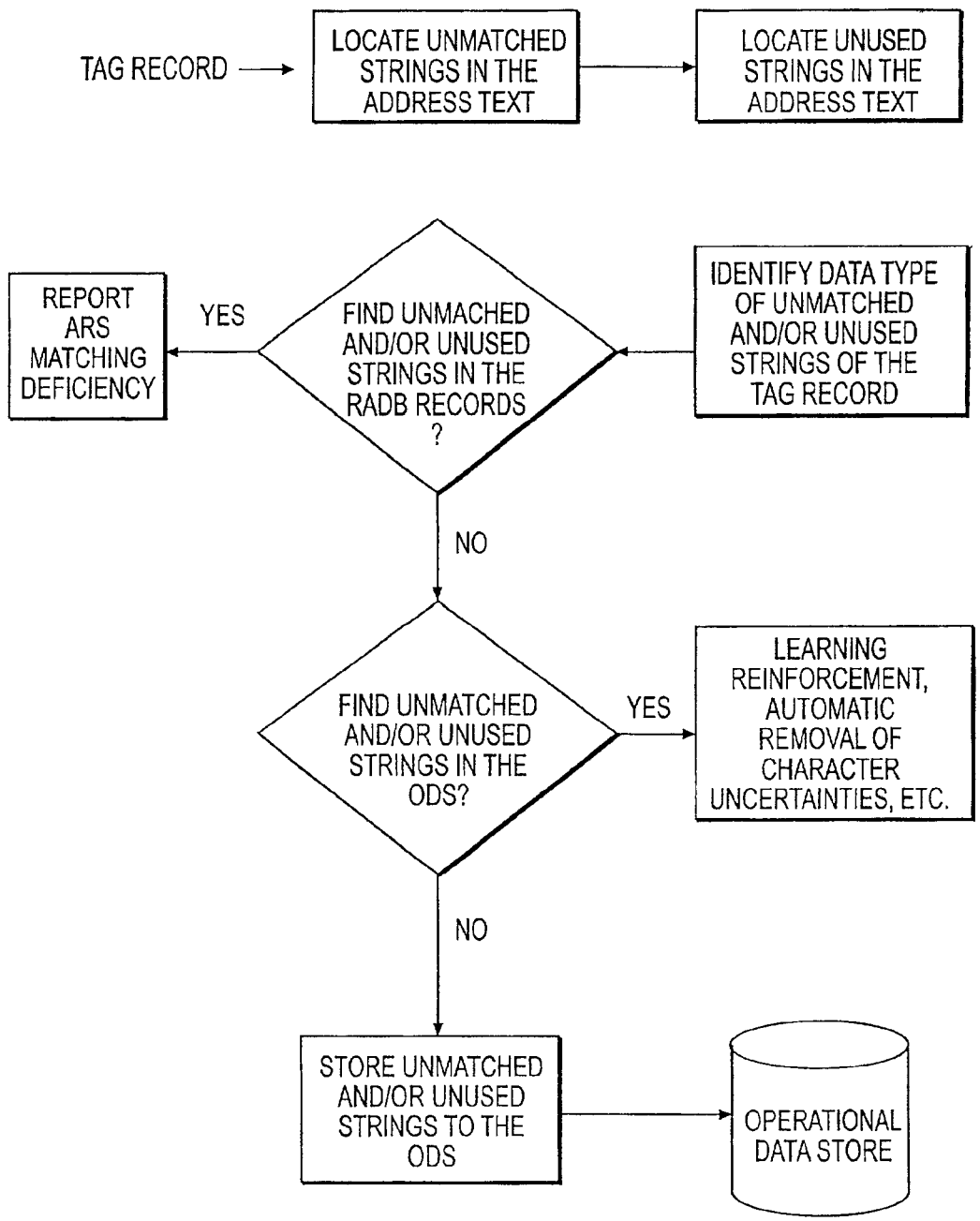
FIG. 4 is a block diagram view of the candidate analysis process of the present invention.

Candidate Analysis takes place on the AICC system 100 main computer (FIG. 4). It goes through the list of learning candidates and learns whatever information it can. The Address Resolution Systems (ARS) must indicate the unmatched and the unused text within an address. Therefore, to a large extent, the ALS is dependent on the results of Address Recognition systems. It is possible that because of the time constraints on the Address Recognition systems, they stop matching the text of the address as soon as they are confident of the delivery point. In this instance, the ALS system will be informed that some text has not been used in resolving the delivery point.

It is also possible that the ARS is only asked to resolve to outward Postcode level only, in which case a large part of the address may not be used. In this instance, the scope for learning from the address is severely limited.

To carry out its function, Candidate Analysis must perform the following steps:

Locate the unmatched strings in the address;

Located unused strings in the address;

Identify the data type of unmatched and/or unused data strings;

Match unmatched and/or unused strings with existing Post Office reference address database (RADB) entries; and Match unmatched and/or unused data with promotion candidates.

1. Locating the Unmatched Strings in the Address.

This is achieved by examining the tag data and by interpreting the intermediate resolution results from the ARS. In one example, the ALS was required to find 98% of the unmatched strings. This will largely depend on the accuracy and clarity of the intermediate resolution results from the ARS since the responsibility of marking the unmatched strings lies with the ARS.

2. Locating Unused Strings in the Address.

This is achieved by examining the tag data and by interpreting the intermediate resolution results from the ARS. The Candidate Analysis process finds learning strings within the text of addresses that were flagged as learning candidates. Each flagged candidate may contain several candidate strings. The learning candidate flags are set via the Candidate Acquisition process in the local capture site.

3. Identifying the Data Type of Unmatched and/or Unused Strings.

When the data is promoted to the RADB, it has to be placed in the correct table. Since the tag contains all intermediate address resolution results, ALS will attempt to determine what data type the object might be from the data types before and after the string. Furthermore, in many strings there will be parts of the string that may be used to establish the data type such as Mr, Mrs, House, Road, Plc, Ltd, Room, etc.

In the above example, the ALS shall correctly determine the data type of an unmatched string automatically for not less than 98% of the strings and incorrectly determine the data type for not more than 0.5% of the strings. Since the unmatched strings are result of the Candidate Acquisition criteria that are user defined, the results will vary according to the criteria in a real situation. The Candidate Analysis is rule based and the rules are user-configurable. The Candidate Analysis rules can be tuned to meet the Post Office's performance requirements.

4. Matching Unmatched and/or Unused

Strings with Existing RADB Entries.

If the string is unused, it may or may not exist in the RADB. The risk of the ALS system matching an unused string with an existing RADB entry is that it may achieve a match with the correct entry in the RADB using a technique unavailable to the real ARS. If the entry is in the RADB, it will not need to be learned.

If the string is unmatched and yet exists in the RADB, then what ever is in the RADB is not sufficient enough for the ARS to get a match. However, if the data is an alias of something already in the database, then the two should be linked rather than suggesting there is a new delivery point. For example, some law firms list their partners in the company name. There will be many combinations of order and omissions that all indicate the same firm. These should not result in new delivery points, but should result in aliases for this single firm's name.

In a given example, the ALS shall correctly correlate the unmatched data with existing RADB data for not less than 97% of the strings. Since the learning specialist through the ALS UI administers the matching rules, there is always the possibility of missing or wrong rule definitions due to human errors or technical oversight.

5. Match Unmatched and/or Unused

Data with Promotion Candidates.

This involves looking in the list of RADB candidates in the operational data store to see if there is reinforcement as opposed to completely new data. Any correlation with existing RADB candidates will be counted with a view to subsequent promotion to the RADB. A further complication is that there may be aliases to RADB candidates. For instance if W. Hague and F. Hague start to appear at number 10, they reinforce each other even though they are not the same.

These five essential steps are repeated for each tag record received from the local capture site before the record is deposited in the operational data store 126 (ODS) as a candidate qualified for learning promotion.

6. AR Result Processing and String Matching.

The ALS Candidate Analysis process must process learning candidates that include ambiguous OCR character classification (sub-classing) information. The Tag Database 110 (FIG. 2) used by AICC system 100 ALS Candidate Acquisition contains all intermediate address resolution results.

In the following example, the OCR presents character choices enclosed by parenthesis.
(S5)W(Ilt1)(g9) (B8)EE
London
4(Ilt1)(S5) (DO0)urn(s5)f(OD0)rd R(Do0)ad
Ladbroke Ra(Ec)(ilt1)n(g9) Ltd Different OCR's 104 will present output data in a different format to the ALS. Therefore, the learning specialist must obtain information on performance characteristics of individual Address Recognition Systems and provide proper matching rules for character strings for each type of Address Recognition System.

The ALS can process the data in the AICC system 100 before presenting to the string matching algorithm. The amount of processing depends on the flexibility of the string matching software and the computing resource available for the task. The extreme case is to populate the ODS with all possible combinations of character choices for each OCR result before presenting the data to the string matching module.

Figure 5:
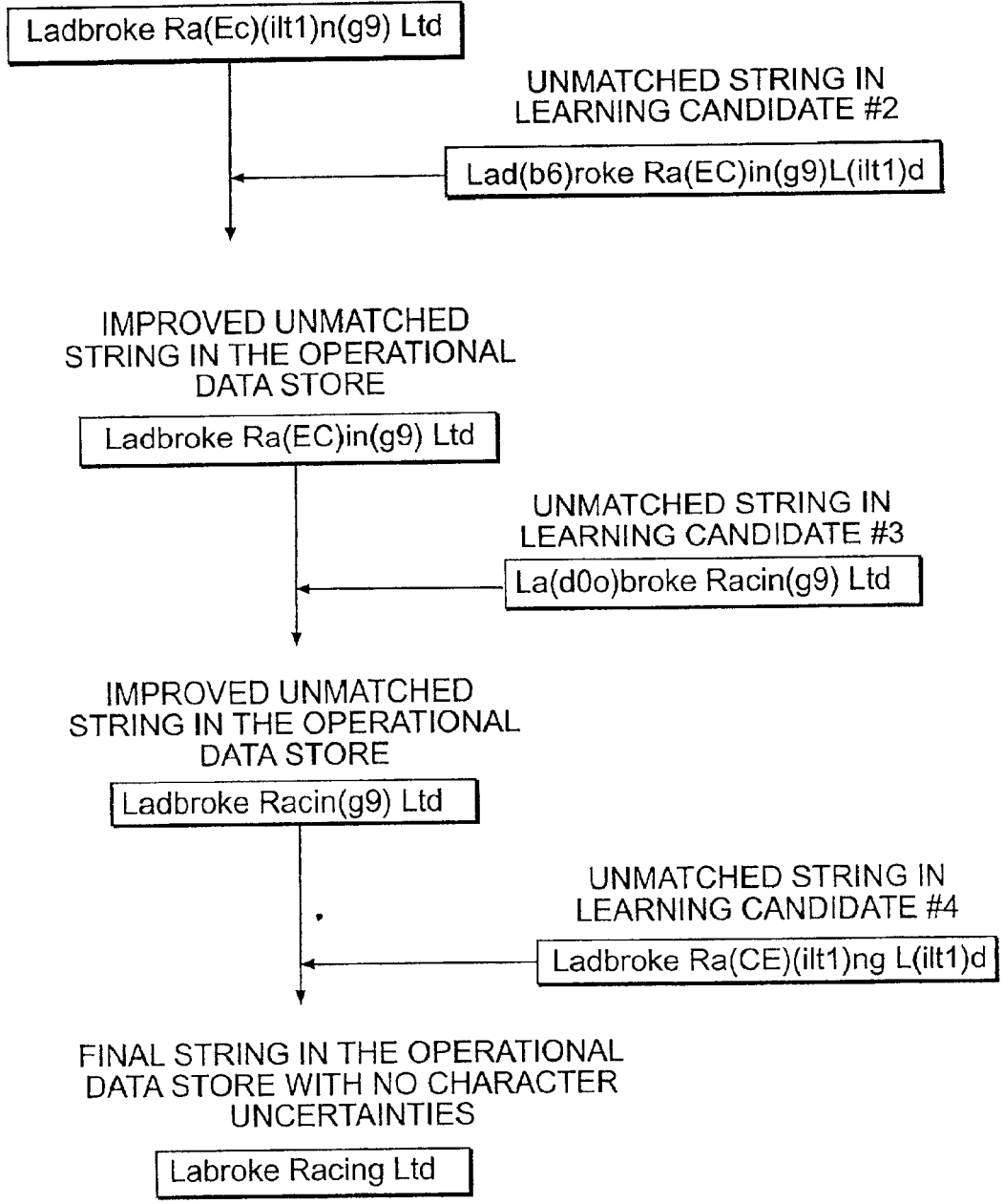
FIG. 5 is a block diagram view of the process of automatic removal of character uncertainties of the present invention.

The AICC-ALS will attempt to remove character uncertainties in the ODS 9 FIG. 5) by observing AR outputs of similar unmatched character strings for the same geographic area delivery point. For instance, consider the unmatched string Ladbroke Ra(Ec)(ilt1)n(g9) Ltd as one learning candidate associated with a postal delivery point. A new learning candidate for the same delivery point may show Ladbroke Racin(g9) L(ilt1)d. The accumulating experience of these learning candidates allows the ALS to conclude that Ladbroke Racin(g9) Ltd is the character string that can be saved with the least ambiguity (i.e., least amount of OCR sub-classing information).

Another example involves information derived from the character position within the string. For instance, it is unusual to have a number in a company or organisation name. The word "Racin(g9)" is unlikely to be a word ending with a number 9. A character's position can become important based on its context in the address text.

In order to determine the similarity of two unmatched strings with OCR sub-classing information, proper tokens for string representation are applied. Two similar unmatched strings will be represented by the same or similar token. Therefore, a string token is stored with each unmatched string in the ODS.

When the unmatched string is close to promotion and there is still character ambiguity within this string, the ALS Candidate Analysis process will request the Candidate Acquisition process to start archiving images for this delivery point. As a last resort, the ALS uses manual data entry (MDE) volume keying to resolve all character ambiguity within this unmatched string before candidate promotion.

The current ALS design learns over a period of time and it does not archive images and utilise volume keying until probable learning candidate promotion. The system design can utilize address interpretation (AI) system resources efficiently to determine data type and correct spelling of unmatched strings.

7. Rules; Data Type Classification.

The publication designating postal address information, such as the PAF Digest in the UK describes the following data elements. Next to each is the description indicating how they might be determined by the ALS Candidate Analysis process.

| Date Item in PAF | Method of Determination |
|---|---|
| Department Name | A department name is generally above a company name. It could be confused with a personal name. It could contain the word "Department" such as "Accounts Department". |
| Organization Name | This has to be determined by its position in the address (i.e., top line below a personal name or department name). It may contain words such as "Ltd.", "plc.", "Bros", etc. These words must be contained in a table that can be edited |
| Building Name | This would be located between the thoroughfare and the organisation or personal name. If it has a number in front of it, then it could be a thoroughfare or dependent thoroughfare, but it might be a flat number in a building. A non-pure number such as 123–126 or 123B is considered a building name. This could of course sub-class as 123(8B) and is equally valid as 1238 or 128B. 128B would only be likely if 123A already existed. Building names may have key words such as House or abbreviations. |
| Building Name | This will probably be on the beginning of a line. It should be a plain number. With sub-classing and misreads it may be difficult to pin down every time, so some false numbers must be generated. One option is to check whether the remainder of the delivery point corresponds to a different delivery point. |
| Sub-building Name | This is an item that meets the definition of a building name but the building name has already been defined. For example:<br>Flat 1 Grange House<br>London Road<br><br>In this example, "Grange House" is the building name and "Flat 1" is the sub-building name. This is not the same thing as a building name alias such as:<br>Grange House<br>123A London Road |

-continued

| Date Item in PAF | Method of Determination |
|---|---|
| | "Grange House" is an alias for "123A". Either may be absent and resolution would be possible. This will be quite common because people can name their houses any way they want to name them. |
| Thoroughfare Name | This can be identified partly from its location in the address and also often from the presence of the thoroughfare descriptor (Road, Lane, etc.) at the end of the line. Care must be taken in differentiating a new locality from a new thoroughfare name:<br>The Grange<br>Long Royston<br>Derby<br><br>Is "Long Royston" a locality or a thoroughfare? It may be possible to find "The Grange" in Derby and therefore resolve it together with a correct Postcode. If Royston was a locality, then "Long Royston" could be a locality alias. If Long Royston Road exists nearby then this could be a mistaken thoroughfare with "Road" missing or perhaps the area is known as "Long Royston" locally |
| Dependent Thoroughfare Name | This is the same as a thoroughfare name, except it exists above a thoroughfare name in the address. |
| Dependent Thoroughfare Descriptor | This is a pre-defined list with abbreviations that can be edited with the ALS UI. |
| Double Dependent Locality Name | The type of address components above and below it can be used to determine this data type. |
| Dependent Locality Name | The type of address components above and below it can be used to determine this data type. |
| Post Town | Post towns cannot really be learned, however spelling variations might be learned. For instance, "Seven Oaks" can be written as "7 Oaks". It is unlikely that AR could match "7" with "Seven" and so this alias must be learned. Aliases for post towns require expert confirmation for promotion since inappropriate aliases could send mail to the wrong part of the country. |
| County | It might be necessary to learn parts of the country that use the wrong counties in the address. Again, aliases for county names require expert confirmation for promotion since inappropriate aliases could send mail to the wrong part of the country |
| PO Box Number | PO Box numbers can appear and disappear quickly, however since the U.K. Postal Service, Royal Mail, controls the PO Box allocations (otherwise it would be impossible to deliver the mail) and new PO Boxes will be entered directly by operators prior to their use. |

Obviously keeping a strong correlation between present data classifications and the PAF postal assigned data types is important so that the data can be output as PAF type flat files for directory generation. The ALS Candidate Analysis process would have qualification rules for each data type. Any unmatched string would be tested against each rule. It could pass more than one rule and therefore could be qualified as more than one data type. Several occurrences of the same string on different mail pieces will over a period of time show which data type the unmatched string should be. Examples of these rules include the following:

Locality: All alpha characters positioned before Post Town and after one of following data types that includes Thoroughfare Descriptor, Thoroughfare name, Building name, Building number, Personal Name, and Organisation name.

Personal Name: All alpha characters positioned before one of the following data types that includes Thoroughfare Descriptor, Thoroughfare name, Building name, Building number, and Organisation name.

Building Number: All numeric characters positioned before data type (Post town, Thoroughfare Descriptor, or Thoroughfare name) and after data type, (Personal Name, Organisation name, or Building name) on the same line as Building name or Thoroughfare name.

If the ALS cannot automatically determine the data type of an unmatched string prior to promotion, the ALS will form a MDE request and ask for expert keying to resolve the data type of this unmatched string. The process of data type classification can be fully defined by the learning specialist using the flexible rule engine embedded in the ALS Candidate Analysis process.

4. Candidate Promotion.

Candidate promotion involves examining each of the RADB candidates to see if there has been sufficient reinforcement for promotion to the RADB. This involves user-defined threshold rules governing the promotion and the mechanism (i.e. automatic or via expert authorisation). Candidate promotion could be based on rules such as how many times an unmatched item has appeared as a particular type and how many delivery points have used it.

Data strings can be unmatched for the following reasons:

1. This string is data that is not in the RADB for the resolved Postcode. For example:

James and Co
London Road

This piece may have been resolved to the Postcode particularly if it has a Postcode in the address, but the delivery point cannot be resolved because the top line is not in the database.

2. Address recognition (AR) algorithm cannot match misspelling or OCR misread to a string that is in the database. For example:

Mr Smithe
London Road

The AR matching algorithm might not be able to match "Smithe" to "Smith". Thus, the unmatched string "Mr Smithe" is passed to ALS.

3. AR derived the wrong delivery point and was then unable to match text in the address. For example:

Mr. Smith
12 London Road

If this was an OCR error and "12" should be "72", Mr. Smith would not be matched at No. 12. The unmatched string "Mr. Smith" would therefore be passed to ALS.

Candidate Promotion, Case 1

The ALS Candidate Analysis process must check the RADB to see if there is data that already exists for this unmatched address.

If "James Johnson and Smith" is in the RADB, then is "James and Co" the same company? This is where string matching is important. If they are indeed the same then either can be fully resolved and a new alias can be learned for "James Johnson and Smith" otherwise a new delivery point must be suggested for "James and Co". If on a subsequent mail piece "James and Co" is seen with the same building number as "James Johnson and Smith" then they are the same and no new delivery point is necessary. In this way, a new word entered into the ODS as a new delivery point can become an alias for an existing delivery point before promotion to the RADB. After the ALS sees many examples, maybe it will become clearer. This is another example why address learning must occur over a period of time.

Candidate Promotion, Case 2

In the example shown, we can ideally spot that it is an alias. However, the word should still be considered for learning because if the AR system cannot match "Smith" to "Smithe" it obviously needs a "Smithe" entry or no matching will ever happen on this spelling.

Candidate Promotion, Case 3

We cannot assume that because there is a "Smith" at "72", this personal alias must be for street number "72". There might be a different Mr Smith at street number "12". If this is just an OCR misread, hopefully the unmatched string will not happen enough to be promoted.

There are some interesting cases for unmatched strings that Bell & Howell will include as part of optional research effort for the Prime System Integrator. For instance, the string below presents a complex issue:

Johnson Ltd.
1 London Rd

If in fact this address should be "1 Main Rd" since the premises are on the corner of London Rd and Main Rd. The ARS might resolve to "1 London Road" and pass "Johnson Ltd." as unmatched text. The ALS Candidate Analysis process should find "Johnson Ltd." nearby and then learn "1 London Rd" as a Thoroughfare name alias for this delivery point rather than create a new company at 1 London Road.

Direct Learning Input

This is input from expert keyers to tell the system to learn information. The reasons that this input is going to the ALS and not going directly to the RADB are as follows:

1. ALS can populate the additional ALS data fields in the RADB in a consistent manner.
2. ALS will manage unlearning of the data when it is no longer needed.
3. The expert keyer data can help in promoting automatic learned data if it is compared with the RADB candidates.

The direct learning facility will allow the operator to specify the weight of the entry (i.e., whether the item is for immediate promotion to the RADB or how much confirmation is required from the mailstream before promotion).

ALS Unlearning

This process requires feedback from the Address Recognition Systems indicating which strings have been used in determining addresses. It might also indicate when a string has conflicted with an assignment. Only ALS learned data in the RADB will be reported since the ALS cannot remove addresses from the RADB simply because these addresses have not received mail recently.

When a piece of learned data reaches the threshold for unlearning, it should be removed to the RADB candidates list in the ODS since it may subsequently begin to appear again. The exact process of unlearning can only be fully specified when knowledge of the type of AR usage feedback is available.

Learning Feedback

The learning system requires the Address Recognition System (ARS) to provide feedback on learned data items. There is an assumption that the Address Reference System will utilise the learned data item for address resolution. The learned item included in the RADB requires reinforcement to stay inside the RADB. If a learned item is not used over a period of time, it should be deleted from the RADB.

During directory generation and update, each ARS should determine whether its directory generation process includes learned items from the RADB. The Directory Generation System 136 (DGS) should return information to the AICC system 100 ALS containing all the learned items that are included and excluded from its current directory look-up process. For each Postal delivery point, the ARS/DGS should inform the ALS of the directory generation status for each alias record incorporated into the current ARS directory look-up software. After the learned information is incorporated into the ARS, the address matching and directory look-up software should update utilisation information of learned items for each delivery point in the RADB.

Since mail sorting is not performed down to the delivery point level for foreign addresses, ARS feedback for learned aliases of foreign countries should be provided at the suitable level of sortation.

The final learning feedback interface should be mutually agreed upon between the ALS system developer and the ARS vendor to achieve the best possible result. There is an assumption the ARS will incorporate all learned items into directory retrieval and address matching, and will incorporate data relating to unused strings from the ARS address matching algorithm. All learned data not used for the ARS address matching will be excluded from performance measurement requirements. Removal of unused learned items from the RADB will lead to unnecessary address re-learning.

5. ALS UI

The ALS UI will be a graphical user interface that will be hosted on the IBM-AIX platform and be capable of displaying on an NT client workstation console. The connection to the IBM-AIX host will be via the TCP/IP Ethernet protocol.

These diagnostics include the ALS self-tests and connectivity tests (heart beat message). Self-tests involve using pre-defined test data for performance confirmation. Diagnostics results will be time-stamped and stored to ASCII log files.

Specification of Learning Candidate Criteria

The UI will allow users to specify learning criteria using any combination of tag records that are related to address and service. Examples related to service include class, indicia type (stamp/meter/PPI), FREEPOST, redirected, etc. The present system also allows the user to specify additional AR system identification information so that learning can concentrate on a particular type of AR systems. The UI will also be the basis of the simulation display so that it will be easy for the operator to see the effect of rule changes on the candidates acquired.

Specification of Candidate Analysis Rules

This UI will allow the operator to specify a number of rules that govern the data matching functions. Development of name and address matching rules will be based on the COTS vendor software toolkit. COTS Rule Editor provides the ability to define the matching rules, abbreviations, etc., and can be easily integrated into the UI.

Specification of Candidate Promotion Criteria

This UI will allow the operator to specify criteria that indicate the circumstances under which learning candidates should be promoted.

Specification of Unlearning Threshold

The ALS Manager UI will translate this threshold into SQL queries so that the correct subset of learned data can be extracted and eliminated from the RADB.

Generation of Configuration file.

The ALS Manager UI will generate rule base and configuration files based on user inputs and distribute the file to the rest of AI systems using communication services provided by the Prime System Integrator.

Traffic Volume Simulation

Based on sample data collected in the AICC system 100, the ALS Manager UI will estimate the number of tag records to be retrieved from the Tag Database within one 24-hour period due to new learning acquisition criteria, such as SQL queries. This simulation will allow the user to look at individual tag records that would be included or excluded as a result of record changes. This function will be integrated into the learning acquisition rule editor so that the simulation is used as part of the rules construction process (see ALS Rule Editor).

Learning Simulation

The ALS UI will demonstrate the effect on existing data due to learning results without applying the changes to the existing data. The simulation will show the statistics concerning address learning. The simulation will allow the user to see the tag or tags associated with a particular piece of learned data (assuming they are still in the tag store).

Production Change Request

The ALS Manager UI allows the user to manually review learning candidates ready to be inserted into the RADB before these candidates are committed to production. The promotion rules should allow the operator to specify rules for automatic promotion to the RADB and rules for manual review before promotion.

Management Report and Rule Base

The ALS UI allows authorised users to print summary reports for all ALS databases and configuration files. Performance statistics for the ALS primarily come from the ODS summary report. It includes, but is not limited to the following values:

Potential learning candidates

Candidates collected for each learning specification/criteria

Learning recommendations

Recommendations for new delivery points

Recommendations for new delivery points associated with each learning specification/criteria Requests to ARS for re-examination of unused/unmatched strings Requests for MDE assistance Access Control The ALS UI will implement user accounts with passwords and multi-level security protection so that ALS data can be guarded against unauthorised access and changes.

D. Preliminary ALS Rule Editor

The ALS UI will be provided to the Prime System Integrator for specifying learning criteria that need to be assimilated and executed in the AI system. The following sections describe the rule editing functions provided for by the three major learning processes in the ALS. A file name is assigned to each learning specification when the user is satisfied with his/her input. This file name also allows the user to edit or delete existing learning criteria specifications at a later time.

Candidate Acquisition

The multiple criteria for identifying learning candidates are configured in the AICC system 100 using the ALS learning editor. Multiple specifications are allowed for learning candidate section. The ALS Manager UI sends each specification to the Candidate Acquisition process in each local capture site using the AI services. The rule elements remain with the AICC system 100.

The UI for the learning criteria will help the user formulate the rules. There will be a series of separate rules that logical-or'ed together to establish the selection criteria for the learning candidates. They can be managed individually by separating the rules this way. Each rule will be a series of logical-and conditions.

Each rule will have an owner, who is the operator who constructed the rule. There will be a comment field for each rule. The operator can enter text in the comment field to describe the rule and the type of candidates expected from rule execution.

In this way it is possible to query the resultant tags to show which tags were acquired as a result of this rule. If a rule is changed, the representative database can be queried to see which candidates would be acquired using this rule alone.

| Candidate Acquisition Rule | Priority | Owner | Change date | Comment |
|---|---|---|---|---|
| Class = First or Second<br>Stamp = Franked<br>Size = DL<br>Unmatched data > 5 characters<br>Resolution level = Delivery Point<br>Print = Machine | 2 | NEP | 1/1/00 | This rule has been put in to catch business-generated first class mail with sufficient unmatched data |
| Recipient = Large User<br>Building Name = None<br>Unmatched data > 10<br>Company Name < > None | 3 | NEP | 10/1/00 | This rule should find building name aliases for large companies |

The priority field indicates the importance of the learned candidates produced by a rule. This is because the combination of rules could produce more data at a local capture site than can be transmitted to the AICC system 100 in the available time. The candidates produced by higher priority rules will be transmitted before those produced by lower priority rules. The user will have the option to:

Add a new rule

Edit and existing rule

Disable an existing rule

When adding or editing a rule, the operator will be guided by the UI. A list of tag attributes will be offered to the user to allow him/her to select a new attribute for inclusion in a rule. There will be a list of comparison methods that can operate on the selected attribute. Depending on the attribute type, the method will be offered a list of values that can be used in the comparison.

For example if the operator chooses the Weight attribute then he/she would be offered comparison operators "Greater than", "Less than" and "Equal to". The operator would then enter a value for the comparison. If the operator chose "Class" as the attribute then he/she would be offered "Greater than", "Less than" and "Equal to" as the comparison method and then "Unknown", "First", "Second", "Mailsort 1", "Mailsort 2", "Mailsort 3" the value. If the "Equal to" operator is chosen, then one or more values can be selected.

The values would, where possible, be gleaned from the tag database on a periodic basis so that the operator is presented with any new tag attribute values that appear.

The rules file will be stored on the IBM AIX server in a form that is understood by the Candidate Acquisition rules UI using an open file structure such as an in an Oracle database or a text file. When the operator has finished any changes, an SQL format will be generated for transmission to the local capture site via AI services.

The operator will be able to determine the effect of rule changes in two ways:

1. By applying the rules to a representative tag database—It is not possible to apply the rules to an actual tag database interactively because the actual tag database is spread across the local capture site and because it would take too long to provide effective feedback. The operator will be able to see summary statistics of the candidate acquisition simulation and examine individual mail piece tags if required.

2. By committing the changes and then the following day viewing the results of an actual candidate acquisition run—The operator will be able to view statistics showing candidates that have been acquired as a result of the rule changes and candidates that have not been acquired as a result of the rule changes. These statistics would be available as a result of the change control in the acquisition rules formulation. When a rule is changed, its previous form is maintained with a priority of "0" so that its candidates do not consume bandwidth unless available "but" statistics are gathered. The operator will be able to see individual mail piece tags if required.

The candidate analysis process will keep statistics about the number of candidates from each rule that produced learned data.

Candidate Analysis

This UI will allow the operator to specify the rules that govern the following functions:

Identification of unmatched data type by position

Identification of unmatched data type by keywords

Matching methods by data type against RADB

Matching methods by data type against existing data in the ODS

The operator will be able to maintain the lexicon of keywords for the company names which would contain words such as "Inc.", "Co.", "Ltd", "plc"which indicate that the text is a Company name. The operator would be able to maintain the lexicon of personal names and abbreviations that would indicate that the data is a personal name. The operator would be able to maintain the lexicon of titles and abbreviations such as "Mr", "Mrs"and "Dr", which would indicate that the data is a name.

Candidate Promotion

The UI for the definition of these rules will be very similar in appearance and operation to the UI for specifying the Acquisition rules. The user will be able to:

Specify criteria by constructing rules to indicate under what circumstances a candidate should be promoted Indicate the rules under which candidates might be promoted via an expert keyer Indicate the rules under which new delivery points might be suggested There will be some standard conditions, such as no character uncertainty and no data type uncertainty. There will be mechanisms to remove uncertainty once a candidate reaches the stage where it could be promoted. When automatic learning fails to remove all character uncertainties, the MDE (Expert Keying or Volume Keying) will remove the rest of character uncertainty before promotion takes place.

The ALS Manager UI will translate the promotion criteria into SQL queries so that the correct subset of unmatched strings can be extracted from the ODS and be included in the RADB alias tables.

Simulation will be an execution on the ODS, but without performing the Update. This means that the ODS must store candidates for a period after they have been promoted so that simulation can indicate whether they would have been promoted with the rule changes. Simulation need not operate on the entire ODS, but on a representative (selectable) portion of it to save time.

Foreign Addresses

For foreign addresses, similar facilities are available. The ALS UI only allows three fields for address elements, including:

City or town

State or province

Country for foreign addresses

International address learning is also based on rule-based analysis. For example:

Logistikk Utvkling Postboks 1181 Sentum 0107, OSLO Norway

Via G. Puccini, 2 16154 Genova Italy

Gruner Weg 8, D-61189 Friedberg Germany

4 QuAI du Point du Jour Case Postale A 104 92777 BOULOGNE BILLANCOURT CEDEX FRANCE BucklestraBe 1-5 D-78467 Constance Germany Siège Social Direction des Achats 4 quAI du Point du Jour 92777 BOULOGNE BILLANCOURT Cedex FRANCE 504 Indira Apt. Carmichael Rd., Bombay 400026 India A-244 New Friends Colony New Delhi-110065 INDIA Faculty of Commerce and Administration CONCORDIA UNIVERSITY Montreal, PQ H3G 1M8 CANADA 12–16 Tryon Road Lindfield, NSW 2070 Australia 20 Achter Road Paulshof, Rivonia 2128 South Africa Piedras 575 piso 1 "D" (1070) Buenos AIres Argentina Singapore International Convention & Exhibition Centre 1 Raffles Boulevard, Suntec City Singapore 039593

31Oyama, Narita City Chiba 286-01 Japan

Kitanijyo-nishi, Chuo-ku, Sapporo-city HokkAIdo 060-0002 Japan

154 Ratmankha Road, Amphur Muang Chiang MAI 50200 Thailand

JI. Sisingamangaraja 18 Medan, 20213 INDONESIA

JI. Cut Mutiah, Medan 20152 PO. Box 328-North Sumatra INDONESIA

6800 N. McCormick Blvd. Lincolnwood, Ill. 60712 U.S.A.

17/F, Repulse Bay Garden 18 Belleview Drive Repulse Bay, Hong Kong

2nd Floor, Peace Hotel 20 Nanjing Road (East) ShanghAI, China 200002

2099 Yan An Xi Road ShanghAI, P. R. China 200335

14Flat, AI Qun Xing WAI Ma Rd. SHANTOU, CHINA

MailBox 308, Northeastern University, Shengyang, P. R. China

Niantiao Road, Potou District Zhanjiang City, Guangdong Province People's Republic of China Normally, the country name is written in the lowest line of the address text on international mail. A combination of the national abbreviation with the Postcode is also common.

With foreign mail, there is an assumption that the ALS will obtain a tag attribute indicating that the piece was resolved to a foreign country. If it is resolved to a foreign country, then the AR system has recognised the country name or some other combinations of data elements that indicate a foreign country. ALS's principle task will be to learn information in the top part of a home country address. This is not practical for foreign mail since it would not be practical to learn the name of every person and every company in the world.

With proper rule design, the ALS can learn every town and province in the world against its Postcode. The benefit from this is that when a country name cannot be read, the destination country could be resolved from the town or province name and its corresponding Postcode. The Postcode alone could exist in many countries, but combined with the town and/or province name, the possibility of sorting incorrectly is very unlikely. This gives the ALS a manageable task for foreign mail. For example, depending on the country the ALS can learn the name just before or after the Postcode and associate the name with the Postcode. This means the system automatically builds a foreign town database with aliases and misspellings. It could also learn aliases for country names if the destination was derived from other components such as Postcode and town. Text below the Postcode might be an alias or foreign spelling of the country name.

Additionally, by using this technique, the database complexity for the RADB does not increase by much. There will be tables for recording town/city names and state/province names with corresponding Postcodes. Then we will have the foreign countries aliases table that links them. The format of Postcode or ZIP code will need to be specified in the rule base for every foreign country that is to have data learned for that foreign country.

Since there are many Postcodes assigned to different areas in the world, this learning feature could be enabled on a country by country basis. In our list of examples for foreign mail, there is no Postcode for addresses in Hong Kong. Some addresses the from People's Republic of China do not have Postcodes. For those exceptions, a determination will be made whether additional enhancement or optional research is necessary.

The aim of sorting foreign mail is to determine the destination country and then to determine the entry point in that country for the mail piece. Many smaller countries only have one entry point for all of their incoming mail. Therefore, the only requirement is to determine the country. Larger countries have more than one entry point and the entry point depends on the destination Postcode of the mail piece. These countries will benefit even more from the learned data.

In China, there are special local envelopes with small, red boxes (6 boxes) for Postcode on the upper left corner or the lower right corner of the envelope. The sender must use such envelopes when mailing locally and the Postcode must be filled in these little red boxes. However, addresses posted on the Internet from some of China's web sites still do not have any Postcode. For a country such as China, which is under rapid development, address learning should significantly benefit UK international mail delivery.

The process of collecting foreign country name aliases is presently a task that belongs to the expert keyer. The ALS will not automatically insert any alias for foreign country name into the RADB. The ARS may classify a mail piece as an unknown foreign destination, but see an unmatched data string appeared as the last data item on the last line of the address text. Most likely, the AI system will send the image of this foreign piece to the manual data entry (MDE) for final resolution. The alias for this foreign country name should be sent back to the ALS via Quick Learning. If the foreign destination is derived from other address components such as Postcode and town, foreign country aliases may exist below the Postcode. The ALS can be used to collect and analyse those unmatched strings that contain potential foreign country name aliases. Over a period of time, the ALC can submit these unmatched strings to expert keyers for final confirmation as foreign country name aliases that can be promoted to the RADB.

E. ALS Database Design

These following data sizes are taken from the 1998 PAF Digest., a listing of postal address nomenclature in the U.K.:

| Field | Maximum Size |
| --- | --- |
| PO Box Details | 6 |
| Postcode | 7 |
| County | 30 |
| Post Town | 30 |
| Dependent Localities | 35 |
| Double Dependent Locality | 35 |
| Dependent Thoroughfare Name | 60 |
| Dependent Thoroughfare Descriptor | 20 |
| Thoroughfare Name | 60 |
| Thoroughfare Descriptor | 20 |
| Building Name | 50 |
| Sub-Building Name | 30 |
| Building Number | 4 |
| Organisation Name | 60 |
| Department Name | 60 |

| Data Type | Entries |
| --- | --- |
| Localities | 35,000 |
| Thoroughfares | 170,000 |
| Thoroughfare Descriptors | 200 |
| Building Names | 1,000,000 |
| Sub-Building Names | 25,000 |
| Organisations | 1,200,000 |
| Delivery Points | 26,500,000 |

In the U.K., by way of example, addresses are held on the postal address file (PAF) in a relational format. Each address is held not as text, but as a series of keys, or pointers, which relate to supporting files of address. Address learning is the process of associating PAF delivery points with actual addresses appeared in the UK mailstream using configurable rules. Therefore, there is an assumption that the existing PAF data structure provides a good indication of how the RADB database will look in the AI system.

RADB Design Assumptions

Figure 6:
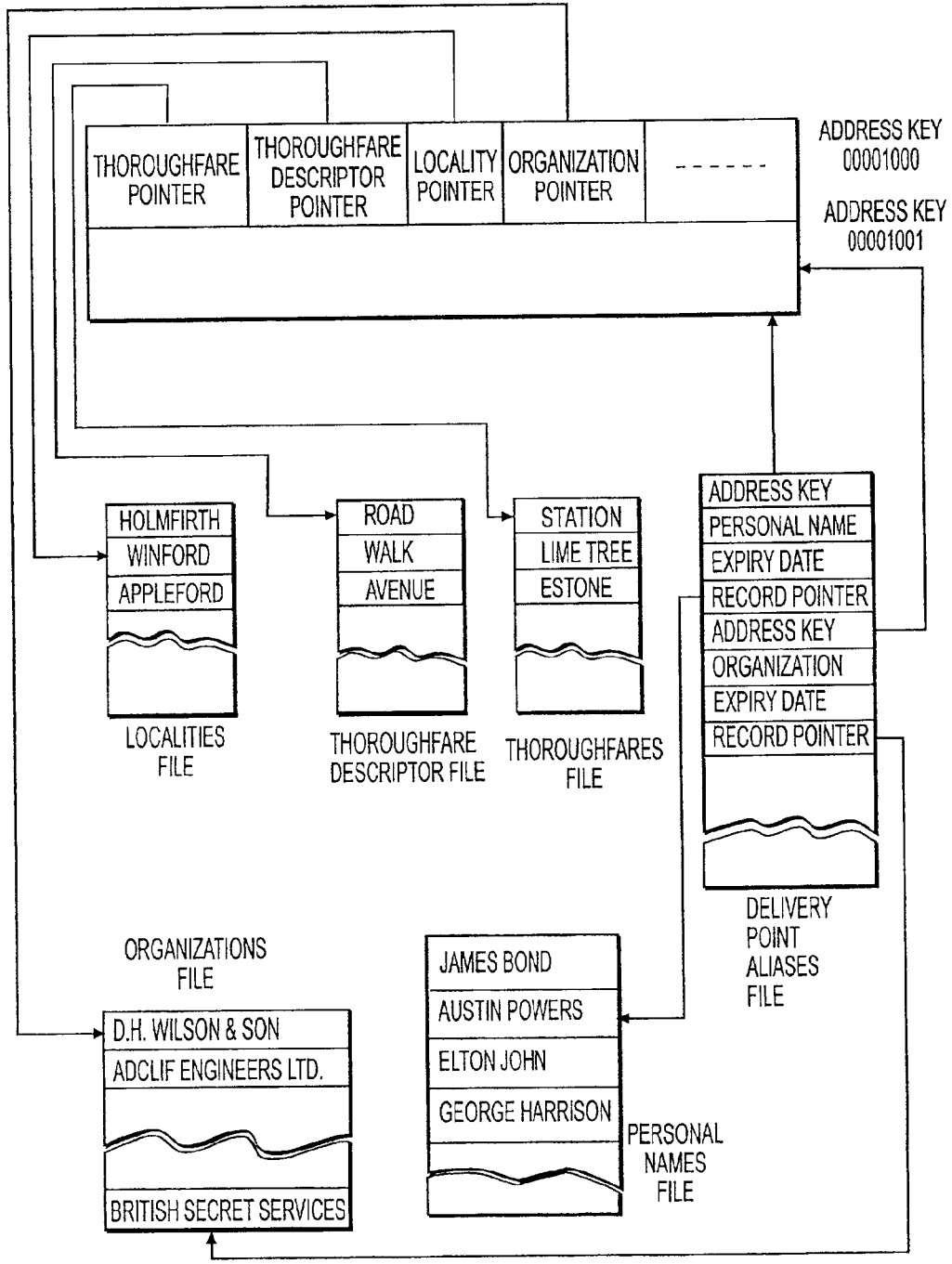
FIG. 6 is a block diagram of a sample reference address database (RADB) of the present invention.

The RADB in the U.K. example contains roughly 26.5 million records. If stored as a full text record for each address, the RADB could be 8 GB without indexes. This data arrangement would have the same text strings stored many times. There is an assumption that the RADB will store each text example only once and then link address records to the text in separate tables. This makes directory generation simple and fast. The RADB size might then be around 2 GB. In the present example, our database estimates assume the RADB to have a U.K. PAF-like database design. An example of the RADB database design is set forth in FIG. 6.

The RADB structure has an influence on the candidate promotion because when the ALS finds a new text string to promote, the ALS must try to find it in the RADB text table first rather than just add it. It is possible that the RADB will provide built-in services for adding new information.

For example, the OCR output string can be as follows:

Barclays Bank

12 High St

Sevenoaks

In this example, "Barclays Bank" is said to be unmatched at this delivery point. When the ALS promotes this "Barclays Bank" the ALS must check whether the unmatched string already exists in the organisations table of the RADB. If "Barclays Bank" does exist in the RADB, the ALS should only add a reference to it in the delivery point record rather than add another example of text into the RADB.

The ALS database design must consider how to handle aliases for the various components in an address. There could be any number of aliases for each component of an address. The present invention implements an ALS alias table in the RADB. The delivery point alias table is based on the following data structure:

TABLE 1

Delivery Point Alias Table

| Delivery Point Record Number | Component Type | Data Status | Confidence Level | Expiry Date | Date of Creation | Usage Counter | Alias Reference |
|---|---|---|---|---|---|---|---|
| 1234567 | Locality | | | | | | 4256 |
| 165738 | Organization Name | | | | | | 1845623 |

In the above table, the first record shows that a delivery point with record number "1234567" has a locality alias. The text of the alias is record number "4256" in the locality table. The second record shows that delivery point with record number "165738" has an Organisation Name alias. The text of the alias is record number "1845623" in the Organisations Name table. Some control information needs to be stored with each record in this alias table. This control information includes data status, expiry date, date of creation (learned date), confidence level, and a usage counter that keeps track of AR feedback for this alias.

The record size is quite small, but new text would be added to the end of the text tables.

This database design means that a delivery point can have any number of alias entries for each address component. It also means that all aliases are stored in existing tables (i.e., the locality aliases are stored in the locality table, the organisation name aliases are stored in the organisation name table, etc.). This design makes directory generation easy for all types of ARS.

The format of this alias table means that all aliases are delivery point specific. There may be situations where an alias needs to be applied to an address component rather than some delivery points. For instance, the post town "Sevenoaks" might have an alias "7 oaks". Rather than putting an entry in the delivery point alias table for each delivery point in Sevenoaks, the RADB database design will include a post town alias table and this table would have an entry that looks like the following:

| Post Town Record Number | Post Town Alias Record Number |
|---|---|
| 6242 | 8657 |

The record "6242" in the post town contains "Sevenoaks" and the record "8657" in the post town contains "7 oaks".

Another example involves Barclays Bank, which exists in perhaps 5000 locations around Britain. This institution could simply be called "Barclays". This abbreviation could happen in many of the delivery addresses to Barclays Bank. As a result, many entries in delivery point alias table could exist for the same alias. Eventually, there could be so many Barclays Bank addresses that the ALS Candidate Analysis needs to create a new Organisation Name alias table entry called "Barclays". The ALS then removes all references to "Barclays" in the delivery point alias table. Now all Barclays Banks addresses would accept "Barclays" as an abbreviation to "Barclays Bank".

Thus, the present ALS database design includes a Post Town alias table, a locality alias table, a thoroughfare alias table, a building name alias table and an organisation alias table. The ALS should have complete control of these alias tables in the AICC system 100 RADB/ALS AIX server. Additionally, each alias table record would have extra data such as status, expiry date, learned date, confidence level, uses, etc.

RADB Alias Records Organisation

There is an assumption that the RADB is organised with text tables for each address component and then a linking table that indicates for each delivery point the entry in each component table it uses.

The principles behind the alias table organisation include the following:

1. The ALS stores the alias text in the same tables as the RADB address text. This means that the ALS does not add further copies of text that already exists in the postal address file tables. It also means that directory generation software only has one set of tables to use for text extraction.

2. A delivery point can have any number of aliases for any address component by having an alias table that has an entry for each alias linking the delivery point to the appropriate entry in a component table.

3. An address component can have any number of aliases.

TABLE 2

Delivery Point Alias Table

| Field Name | Record Size (Bytes) | Description |
|---|---|---|
| Delivery Point ID | 4 | This identifies delivery point to which this alias applies. |
| Component Type | 4 | This indicates which address component this alias applies to and therefore which component table to find the text in. |
| Expiry Date | 7 | This indicates the expiration date of this alias. |
| Learned Date | 7 | This indicates the date of creation of this alias. |
| Status | 4 | This indicates the data status of this alias. |
| Usage Counter | 4 | This records the reference frequency of this alias for address matching. |
| Confidence Level | 4 | This records the ALS confidence level for this alias at time of promotion. |
| Component ID | 4 | This identifies the record in the component table containing the alias. |
| TOTAL | 38 | Total record size. |

TABLE 3

Address Component Alias Table

| Field Name | Record Size (Bytes) | Description |
|---|---|---|
| Component ID | 4 | This identifies record in the component table to which this alias applies. |
| Component ID | 4 | This identifies the record in the component table containing the alias. |
| TOTAL | 8 | Total record size. |

Operational Data Store (ODS)

Figure 7:
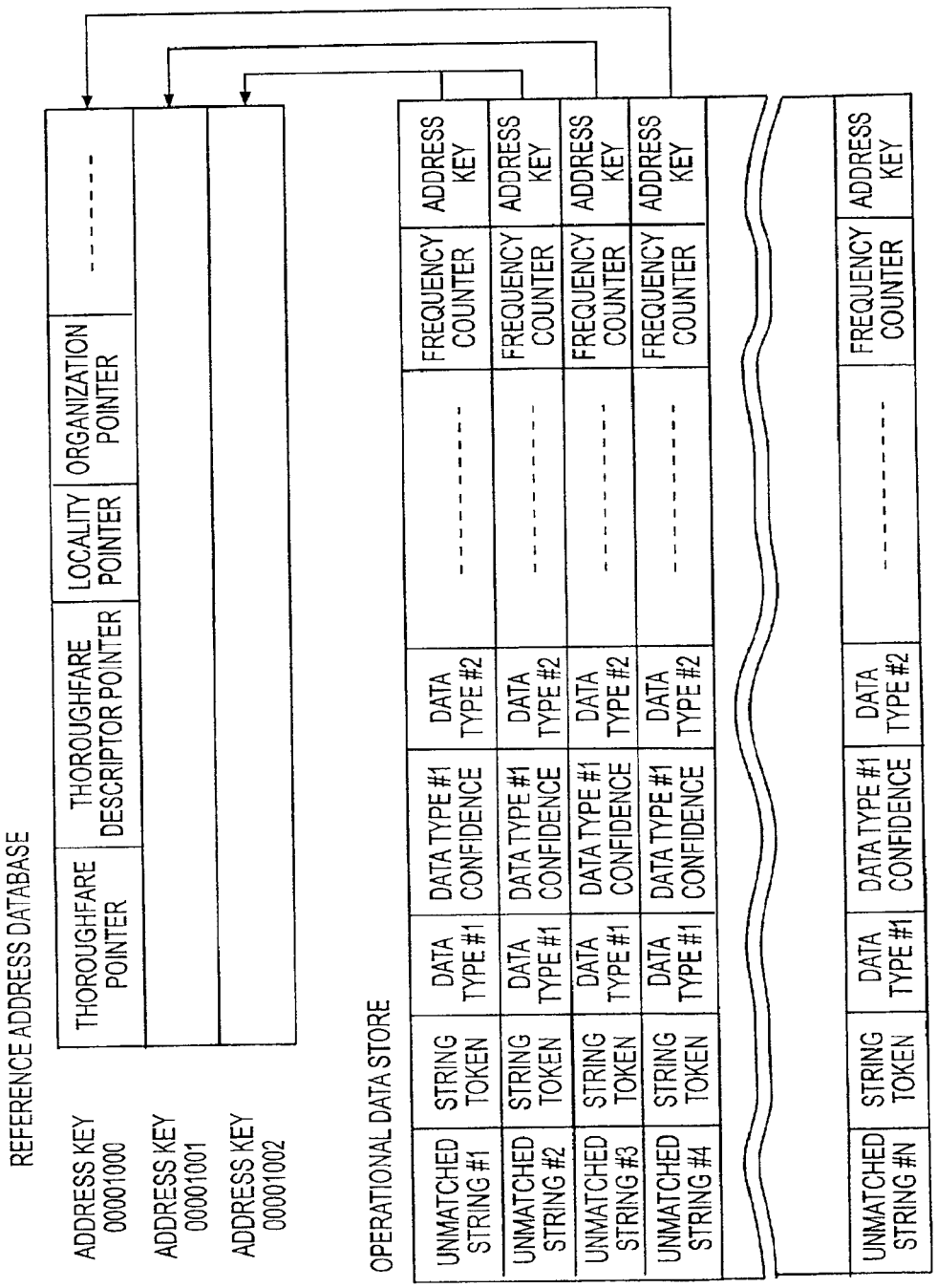
FIG. 7 is a block diagram view of the operational data store (ODS) database design used in the present invention.

The Operational Data Store (ODS) is for storage of the ALS learning candidates only. Its database structure (FIG. 7) needs to reflect the RADB structure to allow easy candidate promotion.

When the ALS Candidate Analysis process receives a learning candidate from the local capture site, the analysis process must first establish which delivery point this envelope has been resolved to. Using the data type classification rules outlined in this proposal and key words, such as Mr, Ltd, etc., the ALS would be possible to establish what address component this piece of text might be.

A search of the RADB text records would be made to see if the unmatched string exists there already. If it does then a query will produce a list of addresses that use the text and we can then find out if any relate to this delivery point or a delivery point on the same thoroughfare or locality etc. If no record of this text exists, it can be added to the ODS alias text table. The ODS alias table will be based on the following structure:

8.4 million Mailsort 3 per day
63.6 million total pieces per day
6.0 million first class pieces per weekend
5.0 million second class pieces per weekend
3100 delivery offices
67 automated mail centres A maximum of 5% of the daily mail pieces is allowed to be transferred from the local capture site to the AICC system 100. Taking the amount of first class and second class mail (i.e., around 48 million each day) into account, the ALS system can be assumed to process at a minimum rate of 2.4 million candidates per day or 56 learning candidates per second. It is possible that the minimum processing rate will increase to 112 candidates per second.

| Text | Text Recrd | Delivery point | Status | Last seen | Occurrences Lclty | Thrfare | Building Name | Org | Personal Name | Post town |
|---|---|---|---|---|---|---|---|---|---|---|
| Long Royston | | 127485 | | 1.1.00 | 1 | 1 | 0 | 0 | 0 | 0 |
| Smith | 13424 | 231232 | | 1.1.00 | 0 | 0 | 0 | 0 | 4 | 0 |

The text record field points to the text entry in the RADB. This field is filled in when promotion takes place and is used to correlate learned data with the promoted data since until the text in the RADB gets to the ARS, we could still get learning requests for it. Equally, if the item is subsequently unlearned, it can be demoted back to the ODS. A "last seen" date should be stored as well, so that words that appear once or twice (but never get promoted) will be removed after a defined period.

The record size is likely to be dictated by the length allowed for the text since the rest of the data is numbers. If we allow sub-classing to be stored because of OCR uncertainty, the maximum length of a word should be increased by a factor of at least two to allow for the brackets and extra characters. The longest item in PAF is 60 characters, so we multiply this number by 2 to allow for sub-classing characters and get 120 characters. There is also some status information held for each record to indicate promotion.

| Field | Bytes |
|---|---|
| Text | 120 |
| Token | 10 |
| Text Record | 4 |
| Delivery Point | 4 |
| Last seen | 7 |
| Occurrences | 24 |
| Status | 4 |
| Total | 173 |

Estimates for ALS Computing Resources

The following volume statistics relating to the U.K. are set forth by way of example as the basis for estimates and calculations.

25.6 million first class pieces per day
22.6 million second class pieces per day
1.8 million Mailsort 1 pieces per day
7.6 million Mailsort 2 pieces per day Since address learning should only be intensive in the initial phase of the AI project and become stable as time goes on, the ALS system must provide sufficient computing resources to handle the sudden surge of learning activities in the initial phase of system deployment. Unless the ALS performance exceeds the address learning rate in the steady state, the ALS will always try to catch up with unprocessed learning candidates and never reach its steady state.

That is one important reason that address learning needs to be performed in steps, and each step should concentrate on certain segment of the population or geographical region of the UK. The local capture site output to the AICC system 100 ALS can be adjusted so that the ALS will always have a manageable processing load. For example, the priority is to learn information associated with UK delivery points. Thus, we can always disable international address learning during initial production operation to allow for more processing bandwidth for UK domestic addresses. If learning every personal name in the UK presents a throughput issue, we may want to just learn all the last names associated with each UK household in London. If address learning during holiday season presents system throughput problem, the AICC system 100 ALS can be disabled during that time.

ALS Steady State

In the UK example, there are 2.2 million trading companies (out of 4.3 million registered limited companies) in the UK with an average of 22% database change in any one year. About 8% of trading companies actually close each year. There are 44.5 million adults (out of 59 million inhabitants) in the UK. Roughly 12.5% population change (i.e., birth, death, immigration, marriage, divorce, etc.), happens each year of which an average 7.7% moves to a new home.

Learning concentrates on the top part of the address (i.e., people's names and organisation's names). Other learning should contribute to relatively minor traffic and resource utilisation in the AI system. Therefore, we can estimate the change to the RADB organisations table as around 484,000 (i.e., 22% of 2.2 million, organisation names each year). Assuming that 7.7% of people in the UK change their address delivery points each year, the ALS will learn around 3.4 million names and associate them with new delivery points.

If we assume a maximum of three aliases per name, around 1.9 million organisation names change and 13.6 million person names change in the RADB per year. Since address elements once learned seldom disappear or change location, and the UK population remains fairly stable over the years, a proper assumption for an ALS steady state learning is 1.9 million organisation names and 13.6 million person names each year. However, this steady state cannot be achieved unless the ALS receives a sufficient number of learning candidates for each delivery point. Therefore, this steady state estimation can only be used as reference to establish parameters for proper performance measurements after further parameters are developed.

Estimated Database Size

Since the U.K.'s PAF has around 1,200,000 organisation names, there are up to one million more company and/or organisation names that can be added into the RADB. The system will also pick up some aliases for each existing organisation name. If a maximum of three aliases per name is assumed, again, there will be 3.6 million alias records for the existing organisation names and 4 million records for the new organisation names. A total of 7.6 million records for organisation names can be added to the delivery point alias table.

As far as person names are concerned, assume up to 59 million person names; but mail belonging to the UK adult population should show up more frequently to be learned by the ALS. Thus, it is estimated that 44.5 million names can be added to the RADB personal name table. Using the assumption of three aliases per name, an additional 178 million records for the delivery point alias table are provided.

Given the example where an initial design of a delivery point alias table that has a record of 38-byte size and the assumption of three aliases per name, the estimated total additional record size is around 6.3 GB for personal names and 275 MB of organisation names. For rough Oracle database sizing, we can multiple each record by 1.5 and then the number of records to yield the table size. In other words, the delivery point alias table is roughly 10 GB large.

Bytes for columns can be added in one index and multiplied by 1.5, then by the number of records for the estimated index size. There are two indices for this table, one for delivery point and the other for component ID. Each key is 4 byte each and there are 185.6 million records. Thus, we have another total of 2 GB for index size. This calculation estimates that around 12 GB is required to store the 178 million personal names and 7.6 million organisation names in our delivery point alias table.

To store a maximum of 44.5 million person names in the person name alias table, a 40-character space is reserved for the name attribute, 4-byte for the Soundex code, and then 4-byte for the person name key. The total file size is about 2 GB. Since we could have up to three aliases per name, that translates into 8 GB (i.e., one name plus three aliases). Multiply that by 1.5 to obtain the estimated 12 GB table size. For the 4-byte key, an estimated 1 GB index table space is required. Thus, a total of around 13 GB is needed for person names.

Since the majority of learning will be on person names and organisation names, the estimate shows that the total additional Oracle database size to the RADB is roughly 25 GB. The calculation performed here is just a simple way to estimate the Oracle database size. Depending on actual implementation, the final RADB database size will vary.

The problem of estimating database size for the ODS is that there is no way to predict how many new words will be learned each day and how long the words will remain in the ODS before being promoted. These are operation variables that cannot be predicted theoretically. Candidate Acquisition depends on the learning rules from the learning specialist. Candidate Promotion depends on the number of learning candidates, which contain similar unmatched strings for the same delivery point, analysed by the ALS. That in turn depends on the ARS performance on resolving mail images for this delivery point and the mail volume going to this same delivery point. Therefore, presented below is a sample analysis of a worst case scenario to arrive at an estimation for the ODS database size.

Using the U.K. sample assuming that 5% of first class and second class UK mail per day (i.e., 2.4 million), learning candidates are added to the ODS database each day and no Candidate Promotion happens at all for 150 days. A rough total of 360 million learning candidates will accumulate in the ODS. Using the estimated 173-byte ODS record size for 360 million records, around 58 GB of raw data is obtained. Multiply this by 1.5 to yield the estimated Oracle database size of 87 GB. Multiply the 4-byte delivery point key by 1.5 to yield an estimated 2 GB of index size.

However, tokens need to be implemented for each text string record. The implementation of permuted keys need between 2.3 and 3.0 index records on average for each database record. In this case, multiply the 87 GB by three to obtain the 261 GB estimated size.

In the database sizing analysis, there is an estimated 261 GB of learning candidates in the ALS and the ALS can introduce an estimated 25 GB of data records into the RADB. If it is assumed that the learning specialist sets up the acquisition rule correctly to focus on subsets of mail delivery areas and learn in step, it is unlikely that no learning promotion takes place in the ALS in a period of 150 days.

If no significant learning takes place within a long period, and the ALS learning statistics show that an insufficient number of learning candidates are received and analysed according to the learning rules, the learning specialist should consider alternatives. The learning specialist can revise the existing learning rules to yield better results. The specialist can simply abandon this target area and move on to another learning project that is more productive. The learning specialist can also set up an age threshold for the learning candidates to eliminate ODS records that do not receive sufficient number of learning inputs from the local capture site. Depending on the final AICC system 100 ALS/RADB system configuration and software design, the available resources to the learning process will determine how address learning should progress in the AICC system 100.

Since disk space is becoming less expensive, the ALS database size is not an issue as far as storage space is concerned. The above clearly demonstrates that storage space is not an issue for the ALS address learning. But depending on the ALS design, the disk I/O could become a limiting factor for throughput performance.

Critical Factors in Throughput Performance

Several factors affect ALS throughput performance, including the number of processors, the amount of cache on each processor, the amount of shared memory, and the disk I/O.

1. Network Traffic

The analysis set forth below shows that network traffic should not be a critical factor for ALS throughput performance.

The ALS will be allowed to transfer a maximum of 5% of the daily mail pieces from the local capture site to the AICC system 100. With 48 million of combined first class and second class mail each day, the ALS system can receive a maximum of 2.4 million learning candidates per day. Assuming a 1000-byte tag record, the AICC system 100 ALS server needs to receive 2.3 GB per day over the WAN. If the data comes in at a fast Ethernet link speed of 100 Mbps at 50% utilisation, the data should all be in the AICC system 100 ALS server in less than 400 seconds. That is an insignificant fraction of the 12-hour address learning period.

2. Processing Power

The present ALS system design dictates that every learning candidate needs to go through at least two database queries before being considered for address learning. The candidate needs to match with the existing RADB candidates to confirm that the candidate contains new unmatched information that can be learned. This is just a simple database query since we already know the delivery point associated with the unmatched string. Then the candidate needs to match with the existing learning candidates in the ODS to determine whether it promotes and reinforces any existing unmatched string already archived in the ODS. Again, the delivery point will direct us to the ODS records that associates with the same delivery point. The computing intensive process is mainly confined to string matching, data type classification, and rule-based application.

By way of example, the IBM RS/6000 Model S7A server can have up to twelve processors. The initial system configuration calls for eight processors. According to the IBM web site, the RS/6000 Enterprise Servers come in symmetric multiprocessor (SMP) models and the AIX operating system provide complete 64-bit computing solutions. Traditionally, multiprocessor mainframes did not scale well beyond four to eight processors. A typical SMP scalability curve shows that an 8-way UNIX machine can process the equivalent of close to six separate CPUs, but adding another four CPUs boosts the multiplier only from six to about eight.

The relative OLTP (ROLTP) of 82.7 for the 8-way S7A server from IBM is an estimate of commercial processing performance derived from an IBM analytical model. The model simulates some of the system's operations such as CPU, cache, and memory. However, the model does not simulate disk or network I/O operations. The ROLTP is also estimated at the time the system is introduced. An IBM RS/6000 Model 250 is the baseline reference system that has a value of 1.0. Therefore, the ROLTP can be used to compare estimated RS/6000 commercial processing performance. Actual system performance may vary, depending on final system configuration and software applications.

The published TPC-C (transaction rate per minute) numbers for the S7A are 110,434.10 tmpC. TPC-C is an order-entry benchmark for business application services. This benchmark is based on a 5-node cluster of S7A servers. IBM does not have any official numbers published for an 8-way S7A server. However, a probable good estimate for the S7A 8-way server is around 24,810 tmpC (i.e., around 413 transactions per second).

The following is provided for illustrative purposes only. Actual implementation detail may vary. 10,000 records in a 100,000-record Oracle database can be searched with a Pentium-Pro 450Mhz NT-based PC in less than ten minutes. This PC has 256 MB memory, and shows roughly 1,000 transactions per minute (i.e., 17 per second). This test was also performed with no significant effort for throughput optimisation. The typical SMP scalability curve shows that for an 8-way UNIX machine, the ALS server may run at around 102 transactions per second. It is difficult to compare processor to processor, but there is good reason to believe that a RS64 II PowerPC 262 MHz processor with 8 MB cache is at least an equivalent of, if not much faster than, a Pentium Pro 450 Mhz Intel processor.

It is projected that the initial 8-processor configuration of the Model S7A server is a cost-effective configuration to use in the ALS development. The increment cost of adding four more processors to the AIX server is not significant. If processor parallelism turns out to be the critical factor, Torrent Systems' Orchestrate can be considered after initial system integration and test.

3. Memory Size

As far as memory size is concerned, it is estimated that 1 GB is a reasonable configuration for this 8-way UNIX system because of initial ALS software design, which can spawn at least one Oracle process per processor. Each Oracle process consumes around 10 MB plus cache space. For this application, the AIX kernel can be assumed to take around 200 MB. That leaves at least 700 MB of cache memory for Oracle. Although the S7A server can have up to 32 GB shared memory, at this time it is not estimated that there will be a need for more than 1 GB memory for the ALS software.

The rule-base, string matching logic, the OCR subclassing removal, and the UI application does not require excessive computer memory. Unless there are Oracle queries that involve database join during ALS learning, there is no reason to see gigabytes of Oracle cache memory in this application. That is possible with certain types of database summary report.

Since other non-ALS applications may be running in the same server, the processor throughput requirements for these non-ALS applications and their corresponding memory needs cannot accurately be determine. It is assumed that all non-ALS processes occupy a small total amount of UNIX and Oracle memory (i.e., less than 100 MB).

4. Disk I/O and Database Performance

Computer memory will matter only if the data is moved fast enough from disks into memory. Thus, database performance tuning and disk I/O are an important focus.

Disk I/O is the slowest of all devices in the AIX server. The hardware bottleneck for the ALS throughput performance appears to lie with the disk subsystem. The data can be spread across multiple disks to allow the data to be processed by parallel I/O streams. This is just part of the database performance tuning in the ALS/RADB server. Parallel database is still a maturing technology and software is definitely behind hardware in every evolution step. Database queries can be broken apart and then some parts can be processed in parallel. Locking and cache can be managed to synchronize the activity of co-operating parallel tasks. Every parallel DBMS must support data partitioning. Parallel DBMS systems provide several schemes for partitioning data across the disks or nodes of a parallel system.

In the delivery of learning candidates from the local capture site the AICC system 100, learning candidates can be sorted in sequential order of delivery point keys for the ALS Candidate Analysis process. That can avoid building up hot spots in the Oracle database queries.

MDE Traffic Estimate

The current ALS design utilises the Manual Data Entry (MDE) in the following areas:

Character Uncertainties. The ALS will form a MDE request for volume keying during candidate promotion when an unmatched string still contains character uncertainties. The AICC system 100 ALS will perform automatic removal of character uncertainties using tag records that contains similar unmatched string in address text for the same delivery point. The ALS will use the MDE to manually remove character subclassing information only when the automatic process fails to remove all character uncertainties before candidate promotion.

Data Type Classification. If the data type of an unmatched string cannot be determined automatically in the ALS, a MDE request for expert keying will be formed before this string can be considered for candidate promotion. In general, the ALS will automatically determine data type for not less than 98% of the strings. Using the MDE for data type classification should rarely happen in address learning implementation.

New UK County Name Alias. In the U.K. example aliases for County name require expert confirmation for promotion since inappropriate aliases could send mail to the wrong part of the country.

New UK Post Town Name Alias. Aliases for Post Town name require expert confirmation for promotion since inappropriate aliases could send mail to the wrong part of the country.

New Country Name Alias. According to user-defined rules for UK foreign addresses, the ALS can collect unmatched strings appeared as the last data element on the last line of an unknown foreign address as learning candidates in the ODS. If the same or sufficiently similar unmatched string is observed often enough over a period of time, the ALS can form a MDE request for expert keying to confirm adding a new country name alias to the RADB.

The present invention performs automatic OCR subclassing removal and data type classification. The need for MDE resources is kept to the minimum. However, the algorithm used by the present invention is dependent on the ARS performance and the number of learning candidates, that contains similar unmatched strings for the same delivery point, received by the AICC system 100 ALS over a period of time. Therefore, our analysis in this area depends on how the promotion rules are set up by the learning specialist.

For instance, it can be assumed that the learning rule demands that the same or similar unmatched string be seen five times for the same delivery point before promotion takes place. In the long run, that in effect means that the ALS reduces the number of learning candidates that may require MDE to remove character uncertainties by five times. 5% of the UK mailstream is now reduced to 1%. In that 1% of UK mail, i.e. 20% of learning candidates, if the ALS can automatically remove character uncertainties from 50% of the candidates, the estimated percentage of daily UK mail that will go to the MDE is only 0.5%. That is 10% of the total learning candidates. 50% auto-correction is a conservative figure.

Assuming the learning rules demand the ALS to see the same or similar unmatched string 10 times before promotion takes place, only 0.25% of the UK mailstream will need the MDE. That is 5% of the total learning candidates. Theoretically, the MDE utilization decreases when the number of candidates to be learned before promotion is increased. The degree of the OCR character uncertainties depends on the ARS performance. The figures given here are an indication of MDE utilization due to the ALS learning process, but it depends on the ARS performance.

A conservative estimate of the number of MDE requests per day can be obtained using the following equation based on the above assumptions:

(Average number of learning candidates * 0.5)/Number of times ALS needs to see an unmatched string for candidate promotion The number of times the ALS needs to see an unmatched string in this equation is specified by the learning specialist. If the automatic process to remove character uncertainties takes too long due to an insufficient number of learning candidates from the local capture site, the AICC system 100 ALS UI can be used to selectively activate use of MDE resources to speed up the address learning process.

CAS SOFTWARE PRODUCTS

The CAS product used for the AICC system 100 ALS Candidate Analysis development is a set of callable routines in "C" programming language that can be seamlessly integrated into the present application software. The objective of the CAS address and name search product is to build search keys that allow an application to find names and addresses without missing information or returning irrelevant records.

Name variations can be caused by phonetics, transcriptions, keying errors, nicknames, short forms, missing words, extra words, noise, and sequencing differences. Four sub-functions are used to produce a key, including:

Sanitization
Word pattern recognition
Phonetic tokenization
Key production
Sanitization The sanitization module removes noise characters, extra spaces, and control characters, and converts lower case letters to uppercase. The sanitization module also contains a small rule base. This rule base is applied after all of the alpha characters have been converted to upper case letters and extra spaces are removed. This rule base is used to recognise words that contain noise characters or prefixes that could be affected by the sanitization process. This sanitization rule base can be easily modified using a graphical UI.

Word Pattern Recognition

After sanitization, the name or address is given to the word pattern recognition routine. Each element is examined by the expert system. The expert system determines how an element should be manipulated. For instance, multiple word phrases such as "IBM" can be converted to "International Business Machines". Nicknames can also be identified (e.g., "Bob" and "Robert" can be used interchangeably to identify the same individual).

The rule base is also used to identify noise words and diminutives. An extensive, predefined set of rules comes with the commercial off-the-shelf (COTS) product. This rule base can be modified.

Phonetic Tokenization

Names and addresses can suffer from a skew distribution. A few words represent the majority of names, while a large volume of uncommon names exist, but occur infrequently. Complicating the problems of skew and distribution are the variations due to name frequency characteristics in different geographical locations and the type of information stored in the database. Phonetic tokenization increases the skewed distribution pattern of common names. By aggravating skew in the distribution of names, both quality and performance are sacrificed.

The CAS product addresses problems due to phonetics by employing analysis routines to determine when phonetic tokenization should be applied. Generic frequency tables are supplied for both the name and street algorithms. Customised tables can be produced by modifying the generic tables through the user shell or by running a representative sample of names through the frequency table generator.

Key Production

Search keys are built after sanitization, word recognition, and phonetic tokenization have been performed. Since many search problems are caused by sequence variations, the COTS tool provides a set of permuted keys for database indexing. Using permuted keys enhances the accuracy of the search process.

At the time of ODS database inquiry, the application receives a name or address element from the MDE and then passes that to the COTS search engine. The engine returns a set of from and to values. The ALS software will use these values to retrieve records that lay between them. Nomination of a range is dependent on performance requirements, precision or accuracy of search, and the number of records stored in the database.

Performance Consideration

To correctly determine the ALS database search organisation, performance expectations, size of database, quality of search and end user requirements are compared against the cost of implementation. It is important to use a realistic test environment to tune the ALS database search application. An approach that works well for a small data sample in the OSL integration may perform differently on the AI production system.

Interface Control Documents

At this time, the following are the Interface Control Documents considered as part of the ALS development contract.

RADB-to-ALS Interface

The ALS must be able to query the RADB to determine the existence of potential learning candidates to prevent duplication of learning recommendations. The ALS can also look into the query results from the RADB to determine whether any existing information can facilitate learning for a potential learning candidate. The ALS output to the RADB is learning recommendations. These learning recommendations can be from the quick learning requests or the rule-based analysis of the ALS Candidate Analysis process.

ALS-to-MDE Inter-segment Interface

The ALS will form a MDE request for volume keying during candidate promotion when an unmatched string still contains character uncertainties. If the data type of an unmatched string cannot be resolved automatically in the ALS, an MDE request for expert keying will be formed before this string can be considered for candidate promotion.

AICC SYSTEM 100-ALS to LOCAL CAPTURE SITE-ALS Inter-segment Interface

Services will be provided for all external system communications in the AI system. This includes all communication services between the AICC system 100 and the local capture site, and the communication between the AICC system 100 ALS/RADB AIX server and the AICC system 100 ALS Console.

ALS-to-ODS Interface

The present inventory includes the assumption that the tag transfer from the local capture site ALS Archive to the ODS is part of the AI services provided to the ALS. SQL queries will be developed so that the ALS Candidate Analysis process can interface to the ODS.

LOCAL CAPTURE SITE Tag Storage Interface

ALS Candidate Acquisition 112 must be able to query the Tag Storage 110 for learning candidates. If the user-defined acquisition rules are translated into SQL queries in the AICC system 100 before transmission to the local capture site, a process can be used to execute these queries to extract learning candidates from the Tag Storage into the ALS archive. AI services are provided to the ALS for transmitting candidate selection criteria (SQL queries) from the AICC system 100 to the local capture site. The ALS also initiates candidate transfer from the ALS Archive 118 to the Operational Data Store 126 using AI services. This is consistent with our assumption that all external system communications between the AICC system 100 and the local capture site are provided.

Workflow Management System (WFM)

The WFM is a distributed control function that applies AI computing and MDE resources in accordance with system-wide policies established in the AI system configuration files. The ALS receives quick learned items, address recognition results, and input from expert keying application via the WFM. The ALS also requests services from the MDE and the ARS to further process learning candidates.

Information Management Subsystem (IMS)

The purpose of the IMS is to collect and aggregate information on the current AI system performance and status. The ALS outputs performance data to the IMS for operation and management reports generation.

System Management (SM)

System Management provides the distribution service for all AI components. As a result, ALS can utilise System Management to input system configuration files and address directories. The ALS can also output performance information data to Information Management using the services provided by AI System Management.

Internet Address Learning

The idea of Internet learning is in the same way that search engines crawl through all the web pages in the world looking for new information to index. The ALS would crawl its way through all the web pages looking for addresses to learn from. Every UK address that it finds on any web page could be submitted to AR, and then if there is any unmatched data then it could be learned in the normal way. This improvement could be extended to foreign addresses.

The additions to the standard ALS would be minimal. The additional requirements would include the following:

An Internet connection

A web spider program

An address locator program that could find an address in HTML source

A connection to the ARS that determines unmatched data

A benefit of Internet Address learning is that any new companies with a web presence would be found quickly with the preferred format for company name and address.

Foreign Countries with No Postcode Implementation

The ALS can learn every town or city in the state or province within its country boundary. This is useful, especially when the Postcode system does not exist for a foreign country. When a country name cannot be read, the destination country could be worked out from the town or city name with its state or province name.

Enhancement to ALS Unlearning

In the ALS Candidate Promotion process, whenever a new name or company name is promoted for a location, the ALS can modify the unlearning thresholds for other similar data types at that location. This enhancement would mean that when people move, their names will eventually be automatically unlearned. The ALS will record the date of promotion for any data item. In this way, it is possible to undo promotions by removing items that have been promoted after a certain date.

Enhancement to ALS Candidate Promotion

The ALS stores more information in the ODS against a new string than it does in the RADB. The present system stores the number of times that it has seen an unmatched string as different data types and their confidence levels. When the learned data is transferred to the RADB, this information would be lost. Retaining the records in the ODS for a period of time after promotion can improve our address learning. If the item was unlearned, the ALS could go back to the ODS and pick up this data again and be ready for re-promotion sooner that learning the unmatched string all over again. Therefore, the second enhancement is that the ALS, after Candidate Promotion, will keep learned information in the ODS for a period of time to reduce the learning period for Candidate Promotion. The ALS does not need to learn everything about the new unmatched string all over again.

While the present invention has been described in connection with the preferred embodiments, it will be understood that modifications thereof within the above principles will be evident to those skilled in the art and, thus, the invention is not limited to the preferred embodiments but is intended to encompass such modifications and all equivalents thereto.

What is claimed is:

1. A computerized method for learning a delivery point address and updating a database of such delivery point addresses by using unmatched or unused data from at least one mail piece, wherein the method comprises:
   a. capturing a text string from an image of a first mail piece;
   b. comparing the text string to a first set of preexisting data in the database to determine a match for the data on the mail piece according to a first set of predetermined rules;
   c. separating the matched or used data from the unmatched data or unused data for the mail piece determined by step (b);
   d. automatically correlating the unmatched or unused data from the mail piece to a second set of preexisting data according to a set of predetermined rules to define a set of correlated data; and
   e. updating the database with the unmatched or unused data so that a point of delivery for a second mail piece with the same intended delivery point as the first mail, piece and having similar unmatched or unused data as the first mail piece can be automatically determined.

2. The method of claim 1 wherein the image of the first mail piece is captured by an optical character recognition system.

3. The method of claim 1, wherein said correlation step is performed utilizing a search engine.

4. A computerized system for learning a delivery point address and updating a database of such delivery point addresses using unmatched or unused data from at least a first mail piece, comprising:
   means for capturing a data string of address information from said at least a first mail piece;
   a directory retrieval system database comprising a set of preexisting data relating to an address to which said at least a first mail piece is directed;
   means for comparing the data string to the preexisting data and for separating matched or used data on the at least a first mail piece from the unmatched or unused data;
   a database for storing the unmatched or unused data;
   a rules database comprising a plurality of predetermined rules;
   means for correlating the unmatched or unused data to the set of preexisting data according to the plurality of predetermined rules to define a set of correlated data; and
   a learning database comprising preexisting data and updated with correlated unmatched or unused data, used to determine said delivery point of a subsequent mail piece upon its presentation to the capture means after said at least a first mail piece has been processed by the system.

5. The system of claim 4 wherein said capture means comprise an optical character recognition device.

6. The system of claim 5 wherein said correlation means comprise a search engine.

7. A method of associating unmatched address data with preexisting delivery point address data, the method comprising the steps of:
   obtaining address data;
   comparing the address data with the pre-existing delivery point address data;
   identifying unmatched address data which differs from the preexisting delivery point address data;
   analyzing the unmatched data;
   automatically associating the unmatched data with the pre-existing delivery point address data to define a set of associated data; and
   storing the associated data in a learning database.

8. The method of claim 7, further comprising the step of updating the preexisting delivery point address data with the associated data when the associated data meets criteria for promotion.

9. The method of claim 7, wherein the address data is obtained from mail pieces.

10. The method of wherein claim 7, wherein the address data is obtained from the Internet.

11. The method of claim 7, wherein the step of analyzing the unmatched data comprises:
    identifying a data type for the unmatched data; and
    identifying the corresponding data for that data type in the pre-existing delivery point address data.

12. The method of claim 7, wherein the step of associating the unmatched data comprises:
    creating an alias record correlating the unmatched data to corresponding data in the preexisting delivery point address data.

13. The method of claim 8, wherein the step of updating the preexisting delivery point address data comprises:
    adding an alias record to a corresponding alias table associated with the preexisting delivery point address data.

14. The method of claim 13, wherein the criteria for promotion includes a threshold number of uses of the alias record.

15. The method of claim 8, wherein the step of updating the preexisting delivery point address data comprises:
    adding a new delivery point address to the preexisting delivery point address data in the event that the associated data does not correspond to an existing delivery point address.

16. The method of claim 8, further comprising the step of selectively removing from the preexisting delivery point address data the associated data when the associated data meets criteria for demotion.

17. The method of claim 7, further comprising the step of prioritizing the unmatched data according to selection criteria prior to analyzing the unmatched data.

18. A system for associating unmatched address data from at least one mail piece with preexisting delivery point address data, the system comprising:
    means for identifying unmatched address data which differs from the preexisting delivery point address data;
    means for analyzing the unmatched data;
    means for associating the unmatched data with the pre-existing delivery point address data; and
    means for updating the preexisting delivery point address data with the unmatched data when the unmatched data meets criteria for promotion.

* * * * *